(12) United States Patent
Baxter

(10) Patent No.: US 7,505,237 B2
(45) Date of Patent: Mar. 17, 2009

(54) ELECTRICAL SAFETY OUTLET

(75) Inventor: Michael Baxter, Hillsboro, OR (US)

(73) Assignee: Energy Safe Technologies, Inc., Great Neck, NY (US)

( * ) Notice: Subject to any disclaimer, the term of this patent is extended or adjusted under 35 U.S.C. 154(b) by 296 days.

(21) Appl. No.: 11/539,171

(22) Filed: Oct. 5, 2006

(65) Prior Publication Data

US 2007/0086126 A1    Apr. 19, 2007

Related U.S. Application Data

(60) Provisional application No. 60/724,248, filed on Oct. 5, 2005.

(51) Int. Cl.
*H02H 3/00*    (2006.01)

(52) U.S. Cl. .............................. 361/42; 361/86; 361/87

(58) Field of Classification Search ............ 361/42–50, 361/79, 86–87, 93.1; 324/508–511, 522–523, 324/525, 527
See application file for complete search history.

(56) References Cited

U.S. PATENT DOCUMENTS

| | | | | |
|---|---|---|---|---|
| 3,665,252 | A | * | 5/1972 | Rogers et al. .................. 361/50 |
| 4,059,843 | A | * | 11/1977 | Girismen ..................... 361/102 |
| 4,378,579 | A | | 3/1983 | Hudson, Jr. |
| 4,466,040 | A | * | 8/1984 | Barthel et al. .................. 361/92 |
| 4,915,639 | A | * | 4/1990 | Cohn et al. .................. 439/188 |
| 4,970,349 | A | | 11/1990 | Jones |
| 4,995,017 | A | * | 2/1991 | Sellati et al. .................... 307/86 |
| 5,029,037 | A | * | 7/1991 | Bartelink ...................... 361/49 |
| 5,095,182 | A | * | 3/1992 | Thompson ............... 200/51.09 |
| 5,151,841 | A | * | 9/1992 | Knights ........................ 361/86 |
| 5,267,116 | A | * | 11/1993 | Avitan .......................... 361/45 |
| 5,426,552 | A | * | 6/1995 | Avitan .......................... 361/42 |
| 5,708,551 | A | | 1/1998 | Bosatelli |
| 5,999,384 | A | | 12/1999 | Chen et al. |
| 6,038,115 | A | * | 3/2000 | Kleemeier et al. ............. 361/42 |
| 6,049,143 | A | * | 4/2000 | Simpson et al. ............. 307/126 |
| 6,111,733 | A | | 8/2000 | Neiger et al. |

(Continued)

OTHER PUBLICATIONS

Residual-Current Device, Wikipedia, Nov. 2006, available at: http://en.wikipedia.org/wiki/Residual_current_device.

(Continued)

*Primary Examiner*—Stephen W Jackson
*Assistant Examiner*—Terrence R Willoughby
(74) *Attorney, Agent, or Firm*—Michael F. Krieger; Kirton & McConkie

(57) ABSTRACT

A safety outlet that prevents hazardous conditions is described. Embodiments of the outlet use safe low-voltage DC power to check and ensure that an appliance is plugged into the outlet, that the appliance does not have short circuits or ground faults, and that the appliance is switched on. Some embodiments warn of unsafe conditions. Until the safety checks are performed and satisfactorily passed, embodiments of the outlet keep the AC power turned off and isolated from the outlet. Only then is the receptacle powered, after which the appliance can be used normally. Once the appliance is switched off, the power at the outlet is also turned off automatically. When an appliance is in use, some embodiments of the invention continue providing ground fault protection using GFCI technology. All this is performed automatically and quickly, nearly imperceptibly in normal use. Some embodiments may be integrated with external control systems.

8 Claims, 18 Drawing Sheets

U.S. PATENT DOCUMENTS

| | | |
|---|---|---|
| 6,252,407 B1 | 6/2001 | Gershen |
| 6,455,789 B1 | 9/2002 | Allison |
| 6,552,888 B2 | 4/2003 | Weinberger |
| 6,986,674 B1 | 1/2006 | Gorman |
| 7,400,476 B1 * | 7/2008 | Hull, Jr. .................. 361/42 |

OTHER PUBLICATIONS

Hewitt, Bob, GFI (Grand Fault Interupter) what does it do and what does it not do, 2002 available at: http://www.misterfixit.com/gfi.htm.

Goldwasser, Sam, GFCI, Redwood Kordon, 1998, available at: http://www.codecheck.com/gfci_principal.htm.

Child Safey Products Life Tips, 2006, available at: http://childsafetyproducts.lifetips.com/cat/60344/outlet-covers/index.html.

Carecovers: Child Safety Sliding Panel Outlet Covers, Safe Home Products, Inc., 2006, avialbe at http://www.safehomeproducts.com/shp2/sf/care_cover.asp.

Arc Fault Circuit Interrupter (AFCI) Fact Sheet, Nov. 2006, available at: http://www.cpsc.gov/CPSCPUB/OUBS/afcifac8.pdf.

Consumer Product Safety Commission, Nov. 2006, available at: http://www.cpsc.gov/cpscpub/pubs/16.html.

Appendix 6210-T2 Extension Card Safety, Jefferson Lab, Nov. 2003, available at: http://www.jlab.org/ehs/manual/PDF/6210T2ExtensionCords.pdf.

Electrical Outlet Safety, Acme Parts.com, Inc., 2006, available at: http://www.acmehowto.com/howto/homemaintenance/electrical/outlet-safety.php.

Electrical Outlets Safety, U.S. Consumer Product Safety Commissioner, 2004, available at: http://electrical bobvila.com/Article/789.html.

Technical Data Sheet: National Semiconductor LM181 Ground Fault Interruptor, 8 pages, Jun. 1992 (Copyright 1995).

* cited by examiner

ELECTRICAL SAFETY OUTLET

CROSS-REFERENCE TO RELATED APPLICATIONS

This application claims the benefit of U.S. Provisional Patent application Ser. No. 60/724,248, filed by Applicant on Oct. 5, 2005, the entirety of which is incorporated herein by reference for all purposes.

BACKGROUND OF THE INVENTION

1. Field of the Invention

The present invention relates to electrical outlets, and more particularly to providing safety features to an electrical outlet prior to allowing the outlet to output potentially-hazardous AC power.

2. Background and Related Art

Electrical distribution points, such as power outlets, present a significant electric shock hazard in many situations. Small children, homeowners, workers on construction sites and at dockside are injured every year by preventable electrical faults. Frayed cords, metal objects inserted into an outlet, or an extension cord dropped in water may result in such a fault.

Every year thousands of people are killed or injured by accidents and fires caused by faulty electrical devices or appliances causing electrical shock. Many protective devices are being implemented to protect young children from accidentally accessing an electrical outlet and receiving injuries due to electrical shock. Inserting plastic safety plugs into a wall outlet is currently the most common way to prevent children from receiving an electric shock. Unfortunately, plastic safety plugs provide no protection unless they are reinserted each time immediately after the outlet is used. Additionally, they are ineffective if a child learns to remove them. Gated outlet plates, such as those in U.S. Pat. No. 4,970,349, also provide a measure of protection. Unfortunately, children often learn to bypass the protection provided by both plastic plug covers and gated covers. Plastic covers are also impractical on construction sites, at dockside or in many other electrical distribution systems.

Modern appliances that are more prone to cause accidents are equipped with ground fault protection. Such ground fault circuitry interrupters either interrupt the power until the electric circuit is restored to normal, for example, by manually resetting an electromechanical breaker. Some circuits automatically re-supply power when the circuit returns to normal. Often, such ground fault circuit interrupters are wired directly into the tool, device, or appliance, or may be molded into the cord designated for the tool or device line. Ground fault interrupters are developed to sense minute imbalances in a circuit by current leakage to ground.

Standard electrical built-in outlets, either in the home or in an industrial setting, may be also equipped with a ground fault circuit interrupter, a GFCI. Such GFCI devices provide a test function and a reset function that both work together so that a tripped GFCI cannot be reset if the GFCI circuit no longer provides ground fault protection. The test button can still be operated in the event of an open neutral condition even though the GFCI circuit is no longer powered. A built-in line load reversal feature also prevents the GFCI from resetting if the load and the conditions are mistakenly reversed. The GFCI receptacle face will be live, but there will be no power delivered to devices downstream, indicating a load reversal.

Many attempts have been made to improve the safety of electrical outlets, including the GFCI circuit discussed above. However, these attempts still have distinct disadvantages. For example, GFCI circuits leave an outlet powered until a ground fault current reaches 5-6 milliamps for at least 25 milliseconds. While this could prevent death in some instances, even this low short burst of current may be sufficient to induce potentially-fatal ventricular fibrillation. In fact, currents as low as 1 milliamp have been shown to induce ventricular fibrillation if the current passes directly through the heart. This is particularly true for small children with their smaller bodies and more fragile systems, and it is children who are most at risk due to their propensity to insert small objects, such as a paper clip, into such an outlet.

Other protective schemes are either complicated or fail to provide any more protection from short-term shocks than do the GFCI circuits discussed above. Some systems use circuits that measure loads and currents at the outlet, but such systems rely on measurements made using a full AC voltage (110 volts-240 volts, depending on the situation), and by the time such systems interrupt the measuring voltage, a lethal shock may have occurred. This is due to a failure to isolate the line voltage from the outlet's plug sockets unless a proper and turned-on load is connected to the outlet.

Other complicated systems that rely on multiple layers of protection are expensive to produce and still fail to detect many dangerous circumstances. For example, some systems rely on detecting whether a plug is inserted into the outlet before turning on power. However, this does not prevent a child from receiving a shock when a plug is properly inserted, and the child cuts the power cord with a pair of scissors or knife. Systems that include additional circuitry to limit the shock received in such a circumstance have the above-discussed limitation of failing to prevent the short-term application of potentially-lethal amounts of current, as a short time passes prior to the disconnection of power at the outlet; that is, the circuitry is unable to detect ground faults or other hazardous situations before power is supplied to the outlet and a shock hazard is created. Therefore, all current systems fail to properly protect from unwanted and potentially dangerous electric shocks.

BRIEF SUMMARY OF THE INVENTION

Embodiments of the invention use safe low-voltage DC power to check and ensure that an appliance is plugged into the safety outlet, that the appliance does not have short circuits or ground faults, and that the appliance is switched on. Embodiments of the invention keep the AC power turned off and isolated from the outlet until there is an appliance plugged into the safety outlet, the appliance is determined not to have short circuits or ground faults, and, finally, the appliance is switched on. When these conditions are met, the receptacle is powered and the appliance can be used. Once the appliance is switched off, the power at the outlet is also turned off automatically.

Embodiments of the present invention provide advantages not currently available. Some embodiments provide ground fault detection and protection, as well as short-circuit detection and protection before providing main power to the outlet. With this protection, the outlet is maintained in the off state, and it is impossible for someone to receive a shock from the outlet. Only a low DC voltage is applied at the outlet, and no DC current will flow when a metal object is inserted in one power slot of the outlet as the circuit is not completed. Thus, even minute short-term shocks that are possible with other outlets are prevented by embodiments of the invention. Some embodiments of the invention also alert the user to the detected short circuits and/or ground faults, allowing the user to repair appliances or correct the fault.

Safety is further enhanced in some embodiments by a lamp or LED that illuminates when the safety outlet is supplying power, and turns off when no power is being supplied to the outlet or any appliances connected to the outlet. When a fault condition is detected, a warning lamp or LED lights and an audible warning alarm sounds. In this fault condition the outlet is locked so the power can not be turned on. These warnings provide easily-recognizable mechanisms to see whether the outlet is live and whether a potential hazard may exist, often before the potential hazard can develop into a true shock or fire hazard.

The safety outlet provides this protection automatically, which allows this outlet to be used as any traditional outlet would be. Other embodiments of the safety outlet can communicate fault conditions to a central home automation system or receive operating instructions from the same. Additionally, embodiments of the invention can be fitted with a Ground Fault Circuit Interrupter (GFCI), to provide ground fault protection while in operation as a further protection layer against inadvertent shocks and burns. In summary, embodiments of the invention seek to ensure safety prior to turning the power on and power the receptacle only for the duration it is actively used. Other embodiments provide additional safety after power is being delivered to an actively-used appliance.

Embodiments of the invention may be provided as part of new-home construction. Other embodiments may be used to retrofit to existing outlets, as a type of outlet cover plate. Still other embodiments may be incorporated into the plugs of appliances, such as hair dryers, to provide protection to individual appliances. In these embodiments, the plug-incorporated protection circuitry ensures that no live AC voltage is supplied beyond the plug itself, greatly enhancing appliance safety. Still other embodiments may be incorporated into extension cords, portable power supplies, or mobile power distribution nodes.

Some embodiments control the power to each individual outlet individually, and others control the power to outlets as a group to reduce cost. It is to be understood that the described embodiments are illustrative only. One of skill in the art will readily appreciate the changes that may be made and alternate manners of implementing the embodiments of the present invention. Thus, the scope of the invention is indicated by the appended claims and not by this description.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
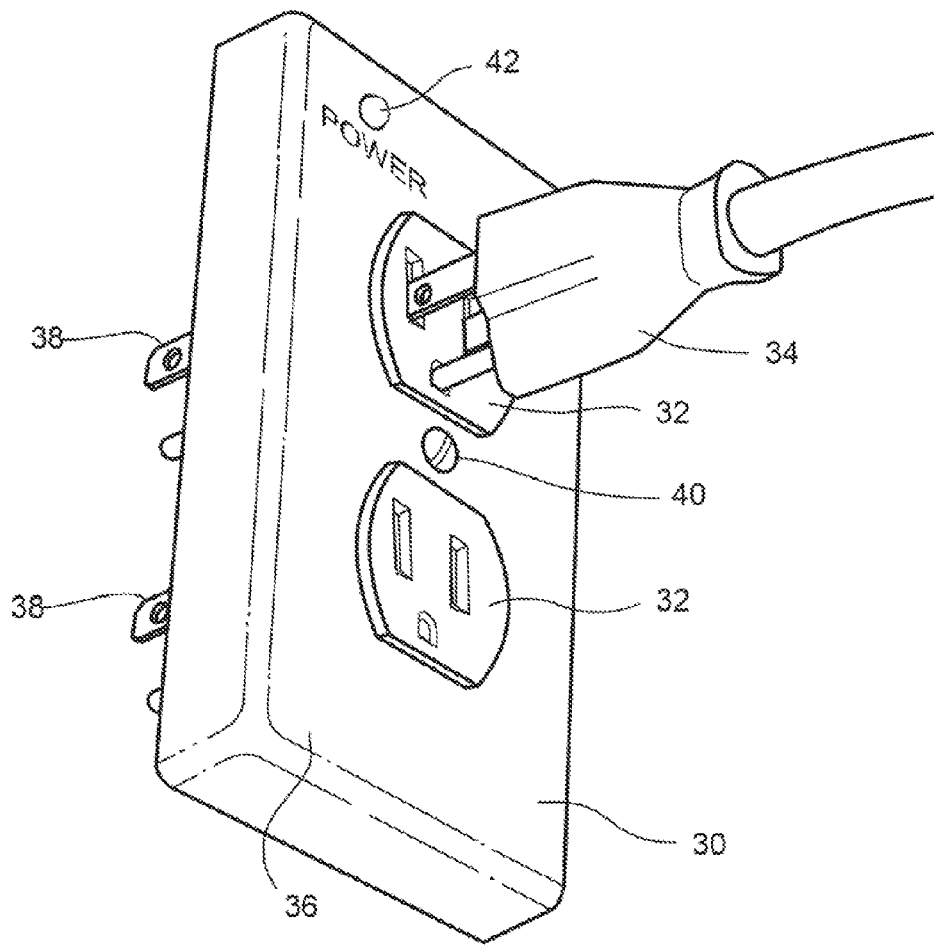
FIG. 1 shows a perspective view of one embodiment of the present invention.

Referring now to the Figures, a description of the embodiments of the present invention will be given. It is expected that the present invention may take many other forms and shapes, hence the following disclosure is intended to be illustrative and not limiting, and the scope of the invention should be determined by reference to the appended claims.

Embodiments of the safety outlet reduce the above-discussed hazards by ensuring safety before supplying line power to the receptacle. For example, unlike the outlet described in U.S. Pat. No. 6,552,888 to Weinberger, embodiments of the invention use safe low-voltage DC power to check and ensure that an appliance is plugged into the safety outlet, that the appliance does not have short circuits or ground faults, and that the appliance is switched on. For example, where Weinberger's outlet will not detect ground faults without the power turned on (and with the power turned on, ground faults are only detected in Weinberger's outlet using standard GFCI circuitry), embodiments of the current inventive safety outlet are able to detect ground faults before AC line power is delivered to the outlet. When such ground faults are detected by these embodiments, the AC power is never supplied to the outlet.

Furthermore, it appears from Weinberger that the load detection performed by Weinberger is unable to discriminate between short circuits and a standard appliance load. This means that if a short circuited appliance is connected to the Weinberger outlet, it will provide power to the appliance (and short circuit) until the current exceeds the current threshold and the Weinberger outlet interrupts power. The same problem occurs with a metal object inserted into both prongs of the outlet (such as a paper clip), or when a plugged-in appliance has its cord cut (by a child with scissors, or a construction worker's shovel, for example). Unfortunately, the short burst of current provided by the Weinberger outlet may be enough to cause a shocked person to enter ventricular fibrillation or die. In contrast, embodiments of the invention ensure that no AC power is delivered in any short-circuit circumstance.

Embodiments of the invention keep the AC power turned off and isolated from the outlet until there is an appliance plugged into the safety outlet, the appliance is determined not to have short circuits or ground faults, and, finally, the appliance is switched on. When these conditions are met, the receptacle is powered and the appliance can be used. Once the appliance is switched off, the power at the outlet is also turned off automatically.

Safety is further enhanced in some embodiments by a lamp or LED that illuminates when the safety outlet is supplying power, and turns off when no power is being supplied to the outlet or any appliances connected to the outlet. When a fault condition is detected, a warning lamp or LED lights and an audible warning alarm sounds. In this fault condition the outlet is locked so the power can not be turned on. These visual and aural warnings provide easily-recognizable mechanisms to see whether the outlet is live and whether a potential hazard may exist, often before the potential hazard can develop into a true shock or fire hazard, as in the case where a short circuit has been created.

As an example, suppose a busy parent switched off a clothes iron, and left the room. Suppose, next, that a youngster were to cut the clothes iron's power cord with a pair of scissors. This ordinarily would give the child a shock, a burn, or both. The safety outlet prevents this outcome because when the clothes iron is switched off the power is also switched off at the outlet, and there is no AC power being transmitted down the iron's power cord. Additionally, the audible alarm would alert the parent of the child's actions as soon as the fault condition caused by the child's actions is created.

Suppose, as another example, that a short circuit has developed in an appliance not plugged in to any outlet. As soon as the appliance is plugged in to the safety outlet, and before any AC power is supplied to the appliance, the safety outlet detects the fault, lights up the warning lamp or LED, and sounds the audible alarm. Without any actual safety hazard being created, the safety outlet detected the problem and warned the user. Because no power is being supplied to the appliance or its cord, the user can safely remove the plug from the safety outlet, and have the appliance serviced to repair the short circuit.

The safety outlet provides this protection automatically, which allows this outlet to be used as any traditional outlet would be. Automatic operation is especially important to parents of small children, to workers on a construction site, or to handymen or homeowners using power tools. Other embodiments of the safety outlet can communicate fault conditions to a central home automation system or receive operating instructions from the same. Additionally, embodiments of the invention can be fitted with a Ground Fault Circuit Interrupter (GFCI), to provide ground fault protection while in operation as a further protection layer against inadvertent shocks and burns. In summary, embodiments of the invention seek to ensure safety prior to turning the power on and power the receptacle only for the duration it is actively used. Other embodiments provide additional safety after power is being delivered to an actively-used appliance.

Embodiments of the invention may be provided as part of new-home construction. Other embodiments may be used to retrofit to existing outlets, as a type of outlet cover plate. Still other embodiments may be incorporated into the plugs of appliances, such as hair dryers, to provide protection to individual appliances. This may be particularly useful, as such appliances provide particular danger as they are often used in bathrooms and around water, and even when off commonly have internal parts that are electrically live and that present a shock hazard. In these embodiments, the plug-incorporated protection circuitry ensures that no live AC voltage is supplied beyond the plug itself, greatly enhancing appliance safety. Still other embodiments may be incorporated into extension cords, portable power supplies, or mobile power distribution nodes. Some embodiments control the power to each individual outlet individually, and others control the power to outlets as a group for reduced cost. That the embodiments of the invention may be better understood, some embodiments of the invention will be described in more detail with reference to the Figures. It is to be understood that the described embodiments are illustrative only. One of skill in the art will readily appreciate the changes that may be made and alternate manners of implementing the embodiments of the present invention. Thus, the scope of the invention is indicated by the appended claims and not by this description.

FIG. 1 shows the external features of one embodiment of the present invention. This embodiment of a safety outlet 30 includes a pair of receptacles 32 designed to receive a plug 34. The receptacles 32 are contained in a housing 36 that also contains the circuitry that performs the functions of the safety outlet 30. This embodiment of the safety outlet 30 has plug prongs 38 spaced and designed to allow insertion of the safety outlet 30 into a standard outlet receptacle (not shown), completely filling the standard outlet receptacle. The safety outlet 30 shown in FIG. 1 also includes a securing screw 40 that replaces the screw of the standard outlet receptacle and ensures that the safety outlet's 30 protection cannot be easily subverted by a child by merely pulling the embodiment of the safety outlet 30 from the standard outlet receptacle. The embodiment depicted in FIG. 1 also includes a power-indicating lamp or LED 42 that illuminates when the safety outlet's 30 receptacles 32 are providing AC power to a plugged-in appliance (not shown).

In the embodiment depicted in FIG. 1, the pair of receptacles 32 may be jointly powered. That is, when an appliance plugged in to one of the receptacles 32 is turned on, power is simultaneously supplied to both receptacles 32. Alternatively, each of the pair of receptacles 32 may be independently powered to increase safety, so that even when AC power is being supplied to one receptacle 32, the other receptacle 32 does not receive AC power but independently determines whether an active appliance is plugged in to the receptacle 32 before supplying AC power. In an alternate embodiment similar to the one shown in FIG. 1 where the receptacles 32 are independently powered, an additional power-indicating lamp or LED 42 may be provided so that one lamp or LED 42 is provided for each receptacle 32.

Another embodiment similar to the one depicted in FIG. 1 further includes a warning lamp or LED (or multiple warning lamps or LEDs where each receptacle 32 is independently powered) and/or an audible warning alarm (or alarms) to signal a fault condition detected at the receptacle(s) 32. In this type of embodiment, the warning lamp or LED or warning alarm turns on when a fault condition is detected. Fault conditions which may be detected and signaled by a warning include a short circuit in a plugged-in appliance or cord, a short circuit occasioned by a metal object inserted simultaneously in both prongs of a receptacle (such as a bent paperclip), and a ground fault detected by the safety outlet 30. These (and other detected faults) may be warned of before power is ever supplied by the safety outlet 30. Additionally, in some embodiments, the safety outlet 30 may also detect faults during use of the outlet 30 and interrupt power and provide the warning.

As one of skill in the art will readily appreciate by reference to FIG. 1, the present invention may be embodied in a compact package, allowing quick and simple retrofits of the invention for existing construction. Additionally, the small package size allows the invention to be embodied in other embodiments such as within a plug for an appliance (like a hair dryer), or in an extension cord. The package may also be incorporated into an outlet package for new construction of size and shape similar to currently-available GFCI outlets. Thus, one of skill in the art will readily appreciate the flexibility and safety that embodiments of the present invention can provide in a wide range of circumstances.

While the invention has been depicted in FIG. 1 for use with standard three-prong outlets and plugs supplying 120 VAC power typically used in residential applications in the United States, one of skill in the art will readily appreciate that this outlet shape and supply voltage is merely illustrative. For example, embodiments of the invention may be provided that accept and control the supply of 240 VAC power for heavy-duty residential applications such as ranges and clothes dryers, or for industrial applications. Other embodiments may have different plug shapes and supply voltages for other countries or for higher amperage outlets. One of skill in the art will readily appreciate the modifications that can be made to the invention to make it satisfactory for a wide range of circumstances and applications.

The function of some embodiments will now be described with reference to FIG. 2. Some embodiments of the safety outlet 30 use safe, low-voltage detection circuitry to detect fault conditions before applying AC power. An electrically-isolated measurement circuit determines if the load impedance is less than some minimum value, such as 1.2 ohms. If so, a short circuit condition is signaled and the AC power remains off. Another part of the measurement circuit determines if the load impedance is greater than some maximum value, such as 900,000 ohms. If so the AC power remains off. Once the AC power is on, other control circuitry monitors the AC load current. When the current drops below a minimum value, typically 10 mA, the AC power is turned off. This control scheme is shown in FIG. 2.

Figure 2:
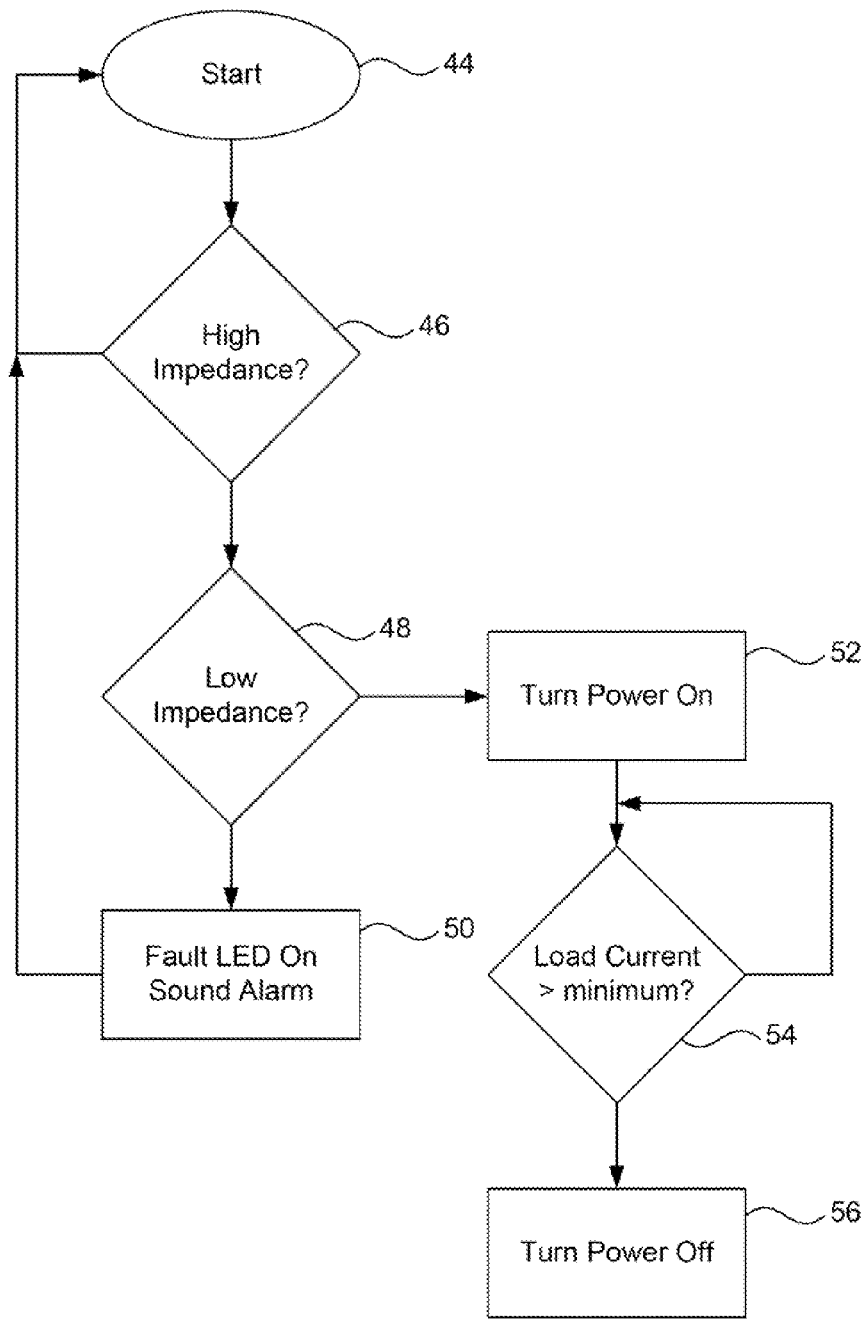
FIG. 2 shows a flow chart of the protection provided by some embodiments of the present invention.

In FIG. 2, execution begins at the start 44 with the power to the receptacle 32 off. Execution then proceeds to decision block 46, where the low-voltage detection circuitry determines if a high-impedance load (a load with an impedance higher than the selected maximum value) is detected at the receptacle 32. A high-impedance load may result from no plug 34 being inserted into the receptacle 32, from an appliance being attached to the receptacle 32 but not turned on, or from something other than a plug 34 being inserted into the receptacle 32, such as a knife inserted into one prong of the receptacle 32 by a child. If a high impedance is detected at the receptacle 32, execution returns to the start and the power remains off and an inadvertent shock is prevented.

Alternatively, if a high-impedance load is not detected at the receptacle 32, execution proceeds to decision block 48, where the low-voltage detection circuitry determines if a load that is less than the selected minimum value has been connected to the outlet 30 (i.e. a short-circuit fault condition exists). A low-impedance load may result from a short circuit in an appliance or appliance power cord, from an appliance immersed in water, or from a child inserting a metal object simultaneously into both prongs of the receptacle 32. If a low impedance is detected, execution proceeds to step 50, where the warning alarm and/or warning lamp or LED is turned on to signal the detected fault. Execution then returns to the start, and the AC power is not turned on. As long as the fault condition exists, execution will loop through decision blocks 46 and 48 and step 50, the warning will continue, and no AC power will be supplied to the receptacle 32. Once the fault condition is removed, execution will loop at decision block 46 until a proper load is applied.

If, at decision block 48, a low-impedance load (fault condition) is not detected, execution proceeds to step 52. A condition where the load is neither high nor low may occur when an appliance connected to the receptacle 32 is turned on. At step 52, the power is turned on to supply the appliance connected to the receptacle 32. Execution then proceeds to step 54, where the AC current supplied to the load is monitored. As long as the current stays above some minimum (i.e. the appliance remains on), execution loops through this step and the AC power to the receptacle 32 remains on. When the current drops below a selected minimum value (i.e. the appliance is turned off or unplugged), execution proceeds to step 56, and the AC power is turned off. Execution then returns to the start, and the receptacle load is monitored to determine if the AC power should be turned on again.

In some embodiments, the detection circuitry and steps depicted in FIG. 2 may be augmented with GFCI circuitry. In these embodiments, further current monitoring occurs in conjunction with step 54 to determine if a ground fault exists, and if a ground fault is discovered, the AC power is turned off to prevent shocks. In alternative embodiments, the load current may also be monitored for a current that is too large, and the AC power may also be turned off. In other embodiments without a warning LED, lamp, or audible alarm, step 50 may be omitted with the power remaining off as long as the fault condition exists. One of skill in the art will readily recognize that the decision blocks 46 and 48 may occur simultaneously or nearly simultaneously rather than in series form as it is depicted in FIG. 2, and that current monitoring at decision block 54 may occur simultaneously with ground fault monitoring and/or current overload monitoring. Other embodiments use the low-voltage measuring circuitry to monitor for ground faults prior to providing AC power to the receptacle 32, simultaneously or nearly simultaneously to monitoring for a high-impedance or low-impedance load.

Figure 3:
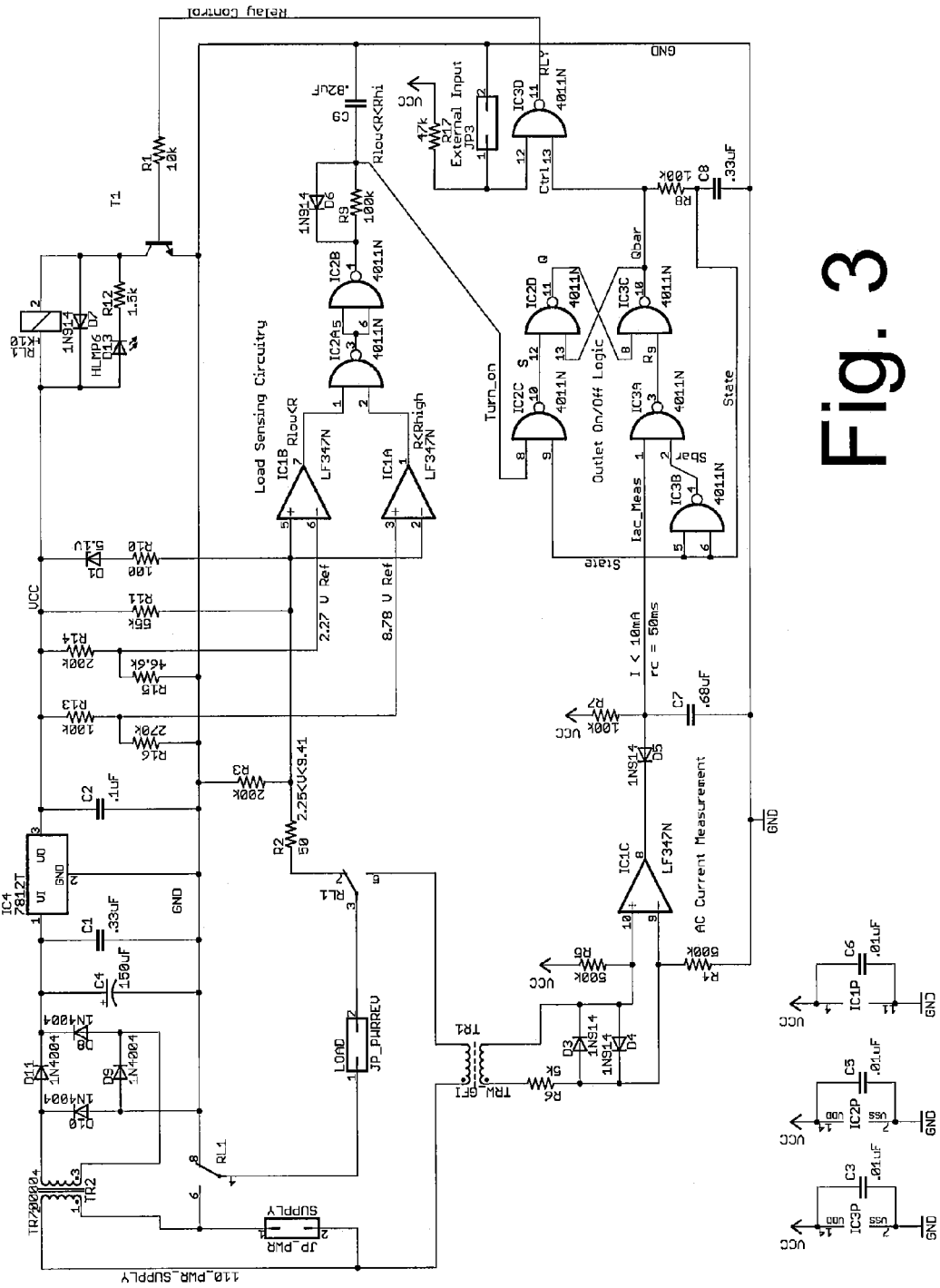
FIG. 3 shows a circuit diagram of one embodiment of the present invention.

The circuitry used to perform these functions will now be explained with reference to FIGS. 3-16. FIG. 3 shows one embodiment of the safety-outlet circuitry. As may be seen by reference to FIG. 3, the circuitry may be provided using standard components using through-hole and surface mount technologies. Also, FIG. 3 supplies representative values for the various components to enable one of skill in the art to practice the invention. In the embodiment depicted in FIG. 3, most of the passive components may be components having 5% tolerance. Although it is possible to implement the circuitry controlling embodiments of the invention using microcontrollers/microprocessors, FIG. 3 clearly shows that the invention may be embodied without using a microprocessor of any type, which potentially reduces the cost of implementing the invention.

The circuit depicted in FIG. 3 incorporates an isolated power supply and isolating relay so that the only conduction path that can turn this circuit on is between the two sides of the outlet. This circuit diagram does not include ground fault detection, but one of skill in the art can readily understand how to modify the circuit to incorporate ground fault detection, and the present invention embraces embodiments incorporating ground fault detection. One embodiment incorporating ground fault detection will be discussed below.

Figure 4:
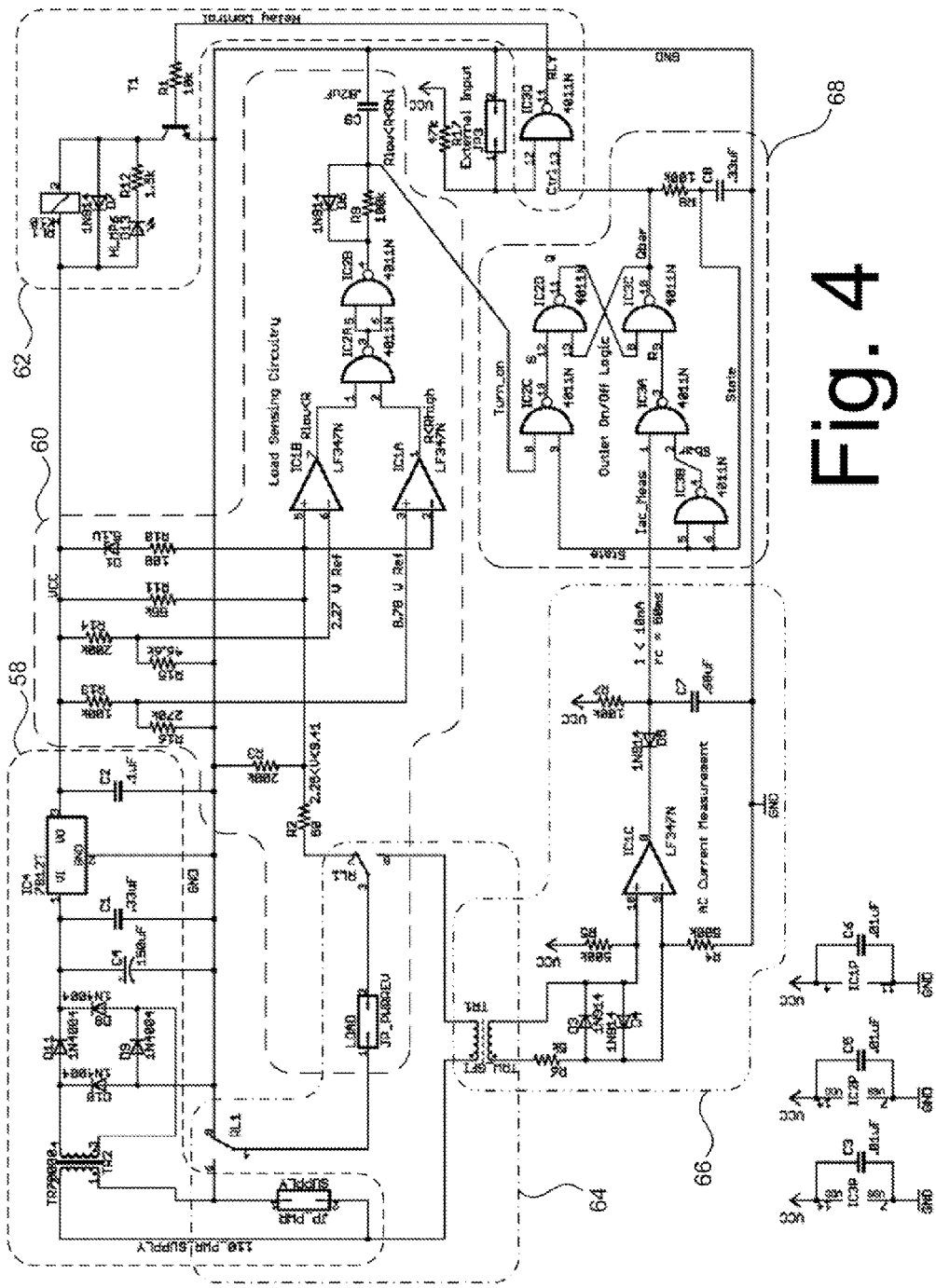
FIG. 4 shows the circuit diagram of the embodiment of FIG. 3, with sub-circuits identified for further discussion.

FIG. 4 depicts the same embodiment as FIG. 3, with sub-circuits identified using broken lines for discussion in later Figures. Sub-circuit 58 is discussed with reference to FIG. 5. Sub-circuit 60 is discussed with reference to FIGS. 6 and 7. Sub-circuit 62 is discussed with reference to FIG. 8. Sub-circuit 64 is discussed with reference to FIG. 9. Sub-circuit 66 is discussed with reference to FIGS. 10-11. Sub-circuit 68 is discussed with reference to FIGS. 12-13.

Figure 5:
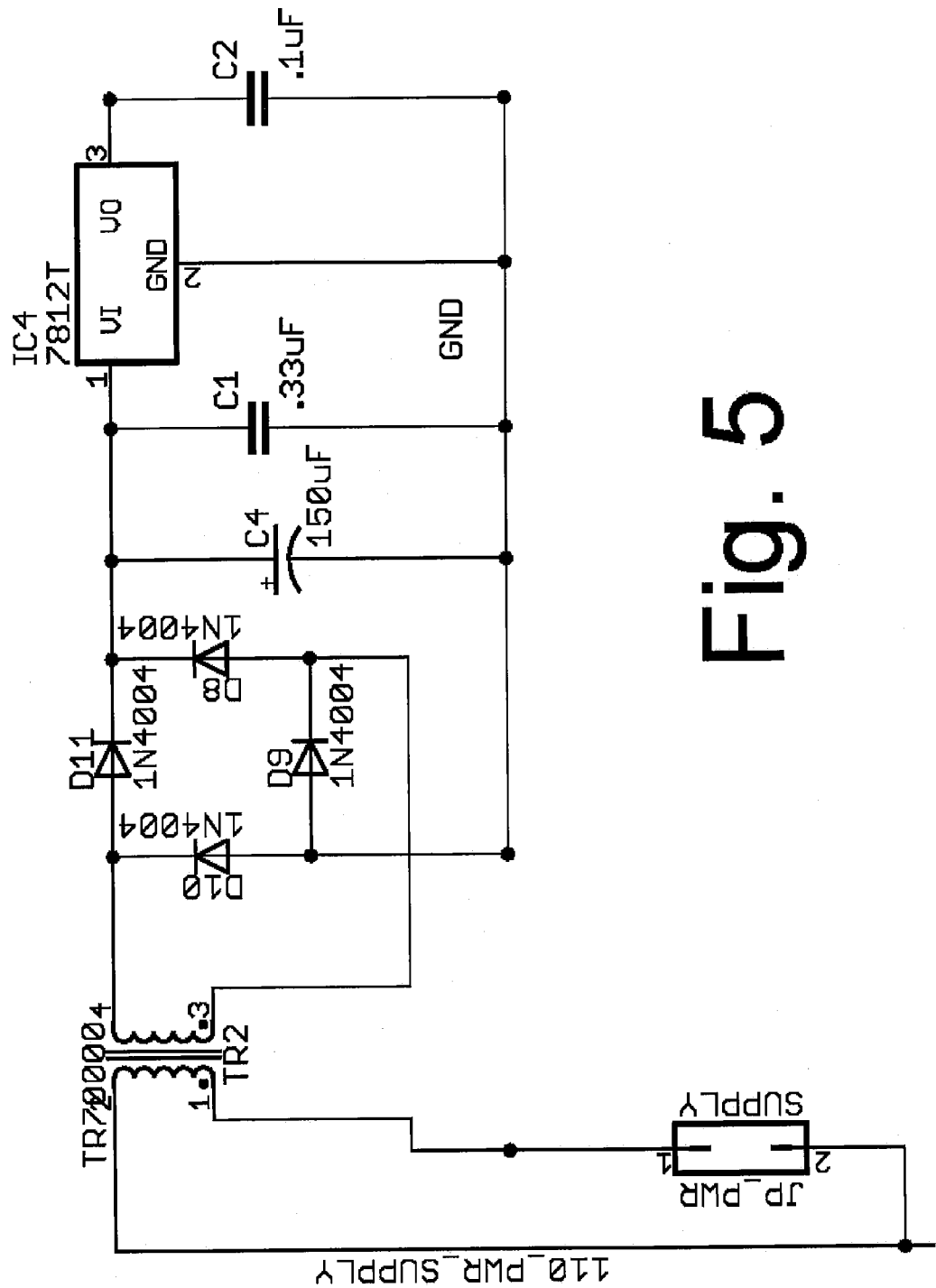
FIG. 5 shows a circuit diagram of one of the sub-circuits identified in FIG. 4.

The sub-circuit 58, depicted in FIG. 5, forms an isolated power source for the control and safety-testing circuitry. Transformer TR2 steps the voltage down to about 20 VAC to drive the full wave rectifier formed from diodes D8, D9, D10, and D11, with a capacitor C4 serving as a leveling capacitor. A regulator IC4 is a standard 12-volt regulator in standard configuration, supplying a 12 volt DC output. Although the sub-circuit 58 depicted in FIG. 5 is advantageous in that it provides an isolated power source, one of skill in the art will recognize that many possible circuits could be used to provide various different levels of DC voltages to supply the control and safety-testing circuitry, and hence the power supply circuitry depicted in FIG. 5 is illustrative and not limiting.

Figure 6:
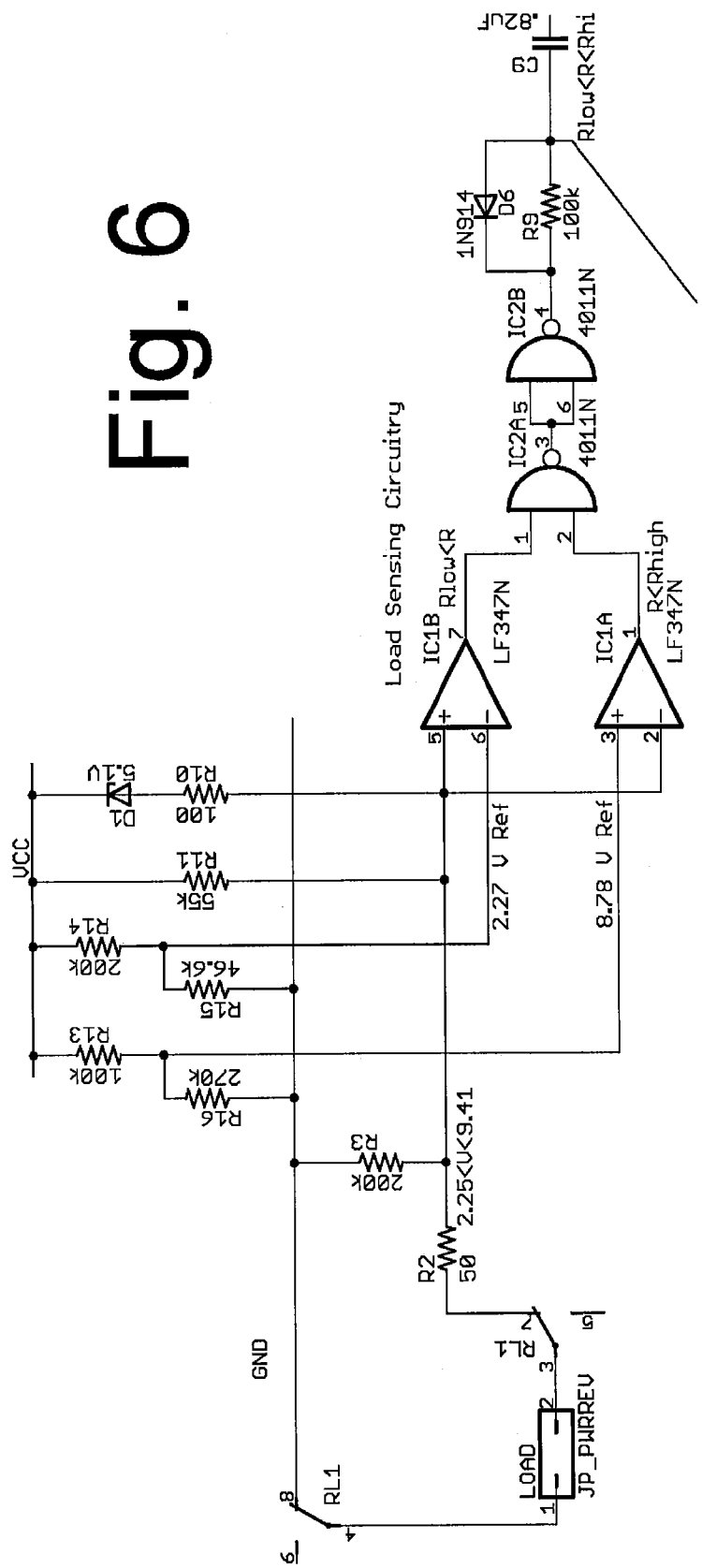
FIG. 6 shows a circuit diagram of one of the sub-circuits identified in FIG. 4.
Figure 7:
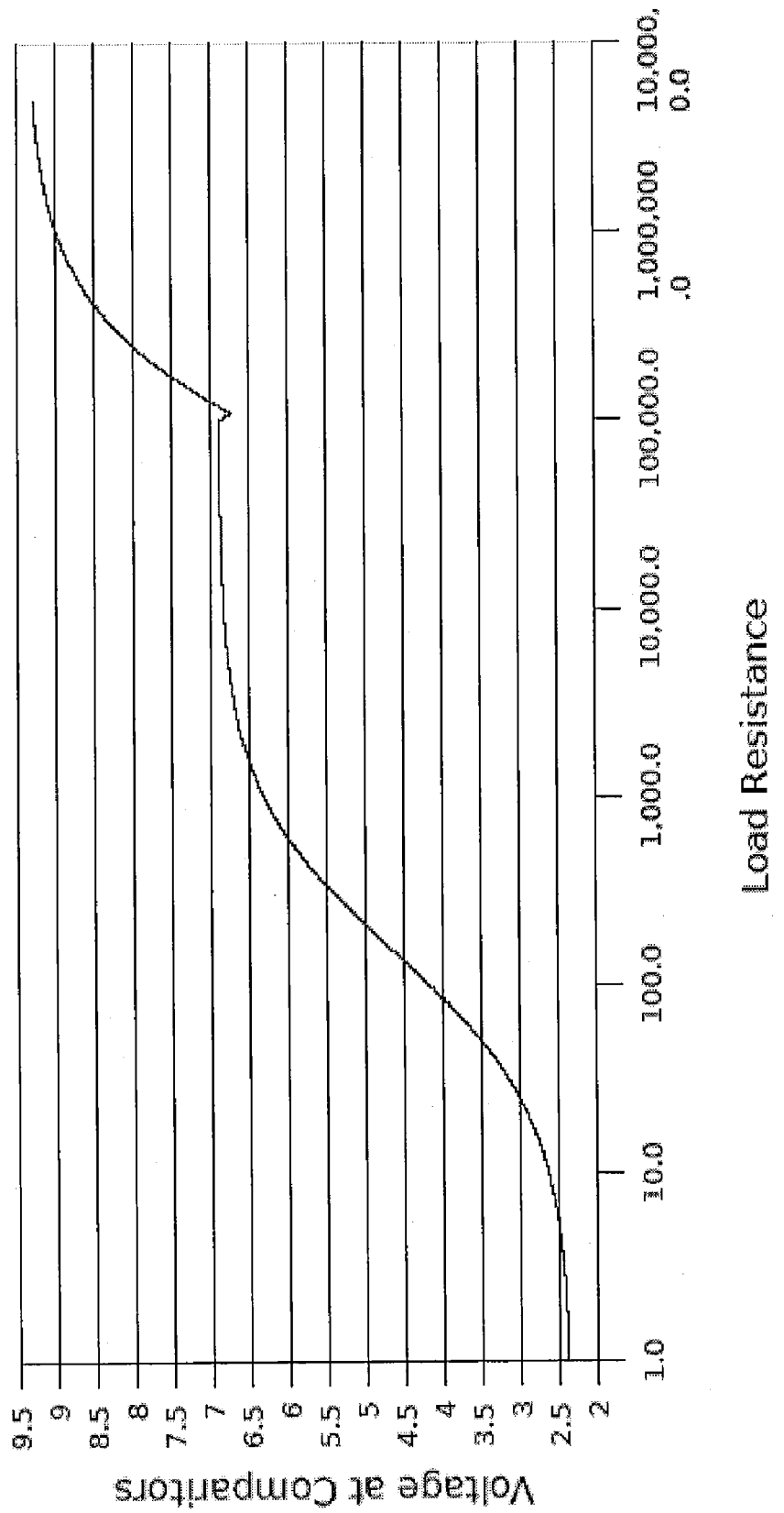
FIG. 7 shows a graph of the voltage performance vs. load characteristics of the circuit depicted in FIG. 6.
Figure 15:
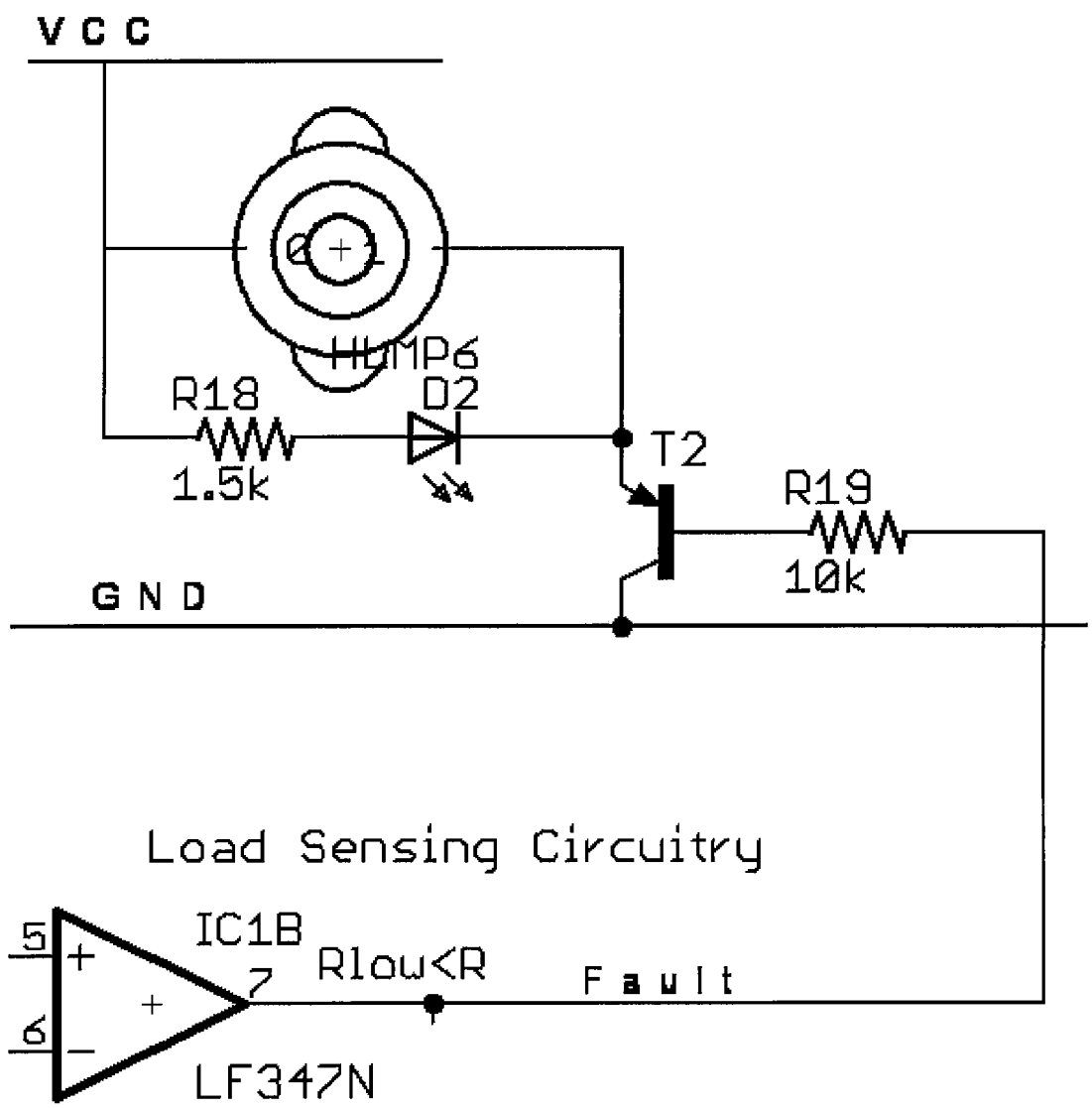
FIG. 15 shows a circuit diagram of a fault-warning circuit capable of use with the embodiment shown in FIG. 3 or with other embodiments of the invention.

The sub-circuit 60, depicted in FIG. 6, provides simultaneous detection of short-circuit (low-impedance) and open-circuit (high-impedance) conditions. A comparator IC1B detects the short-circuit condition and a comparator IC1A detects open-circuit conditions. This detection is accomplished by connecting the load resistance/impedance (whatever is plugged in to the receptacle 32 of the safety outlet 30) in series with a non-linear current supply. The non-linear current supply provides a non-linear voltage/current relationship to the pair of comparators IC1B and IC1A. Stated differently, for a linear change in load impedance, the voltage at the comparators, pin 5 of IC1B and pin 2 of IC1A, will not change linearly. This is provides enhanced resolution for very high and very low impedance loads. This ability is particularly useful when differentiating between a low-impedance load and a short circuit. This behavior is shown in the plot of FIG. 15.

This measurement sub-circuit, incorporates a resistor R3 and a resistor R2 to form limits on the measurement voltage, as well as a Zener diode D1 to provide greater bias before the high-current aspect of this measurement circuit becomes dominant. In the short circuit condition, the comparators IC1B and IC1A will see about 2.2V while in the open circuit condition the comparators will see about 9.4V. This bracketed voltage range allows the use of standard op-amps having a common mode range that does not permit active use near the supply voltages. Resistors R13, R14, R15, and R16 form voltage dividers providing fixed reference voltages. Logic components IC2A and IC2B AND the comparator outputs which drives a 1st order delay element formed by a resistor R9 and a capacitor C9. This delay ensures that the power-on criteria have been met for a sufficient length of time to gain confidence that the detection of a proper load is not a false positive.

Figure 8:
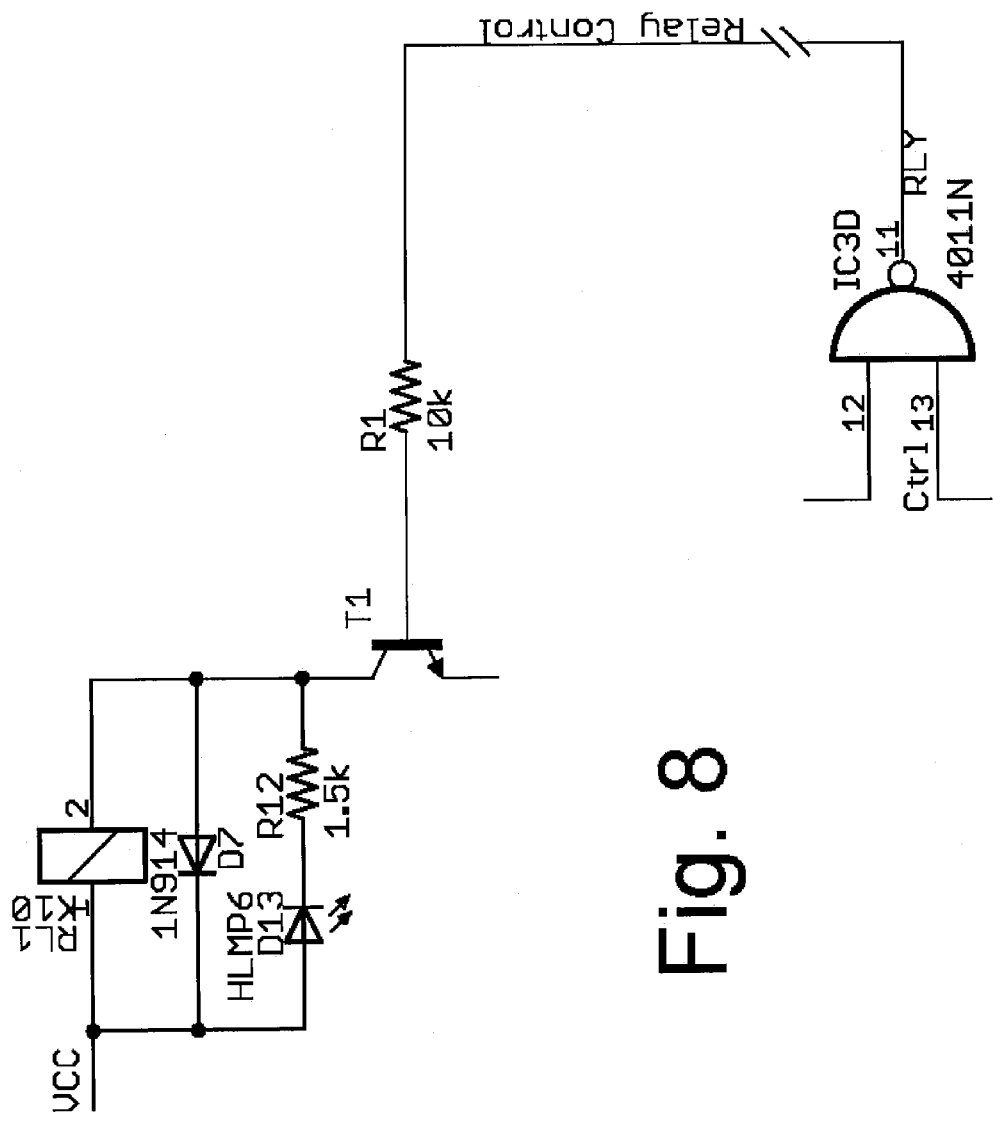
FIG. 8 shows a circuit diagram of one of the sub-circuits identified in FIG. 4.

The sub-circuit 62, depicted in FIG. 8, powers the relay that turns on the power to the receptacle 32. The sub-circuit 62 includes an indicator LED D13 and a relay coil K10. The relay coil K10 is powered by the 12V output from the regulator IC4 (see FIG. 5). A logic circuit (the sub-circuit 68, discussed below) is used to transition a MOSFET power transistor T1. A power transistor T1 connects or disconnects the ground side of the relay drive coil K1, activating the relay and connecting or disconnecting power to the receptacle 32.

Figure 9:
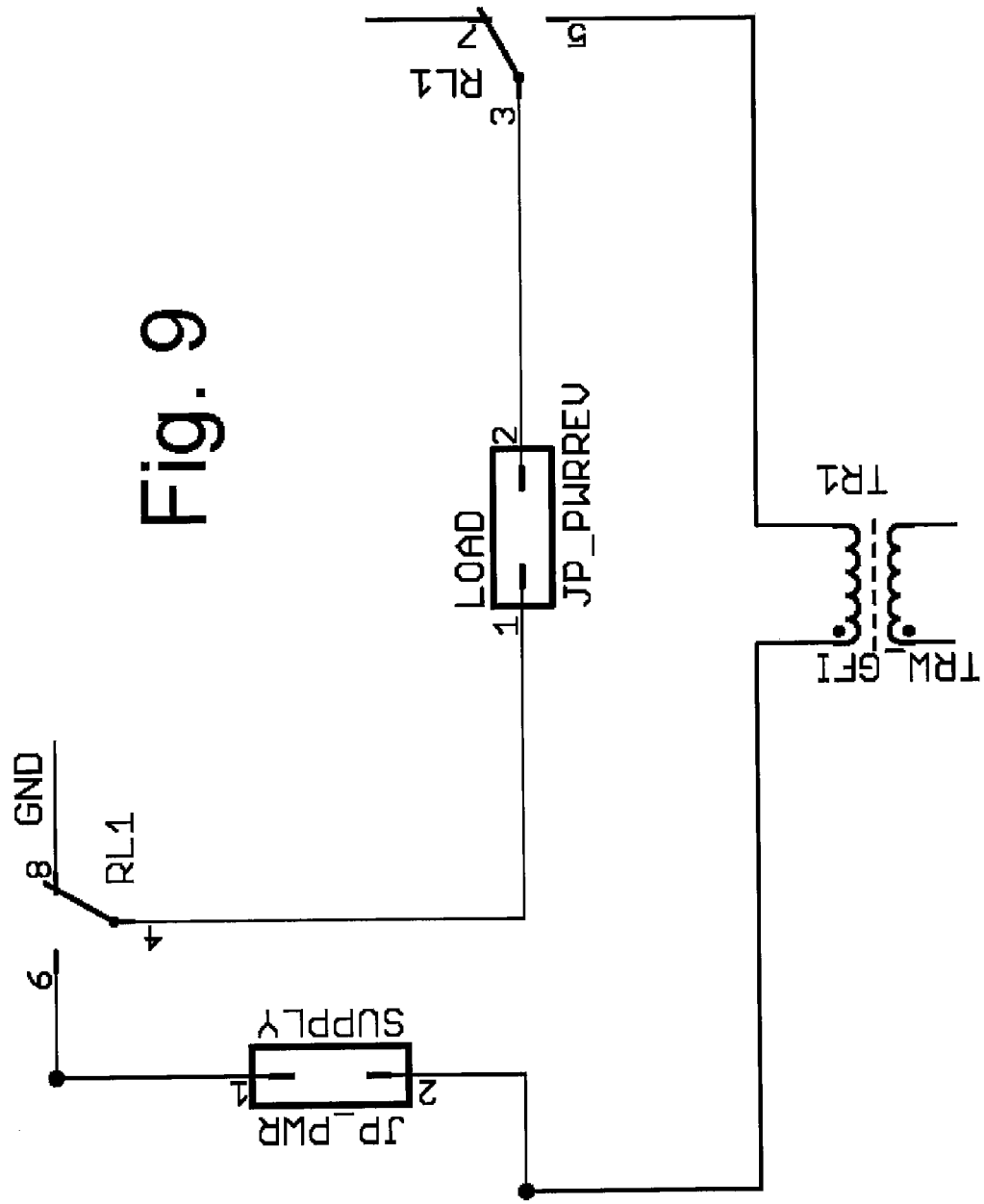
FIG. 9 shows a circuit diagram of one of the sub-circuits identified in FIG. 4.

The sub-circuit 64, depicted in FIG. 9, provides the main AC power switching. The AC power is switched to the outlet by a double-pole, double throw relay RL1. This type of relay is convenient because it provides complete isolation for the outlet while the relay is open. The throw of the relay shown in upper left FIG. 9 is used to switch the outlet to the supply ground, while the throw of the relay shown on the right is used to switch the outlet off the measurement circuit and onto the supply. When the main power is off, the measurement circuit is completed from the output of a resistor R2, through one throw, through the outlet (LOAD), through the other throw of the relay to the isolated ground (see FIGS. 3 and 6).

Figure 10:
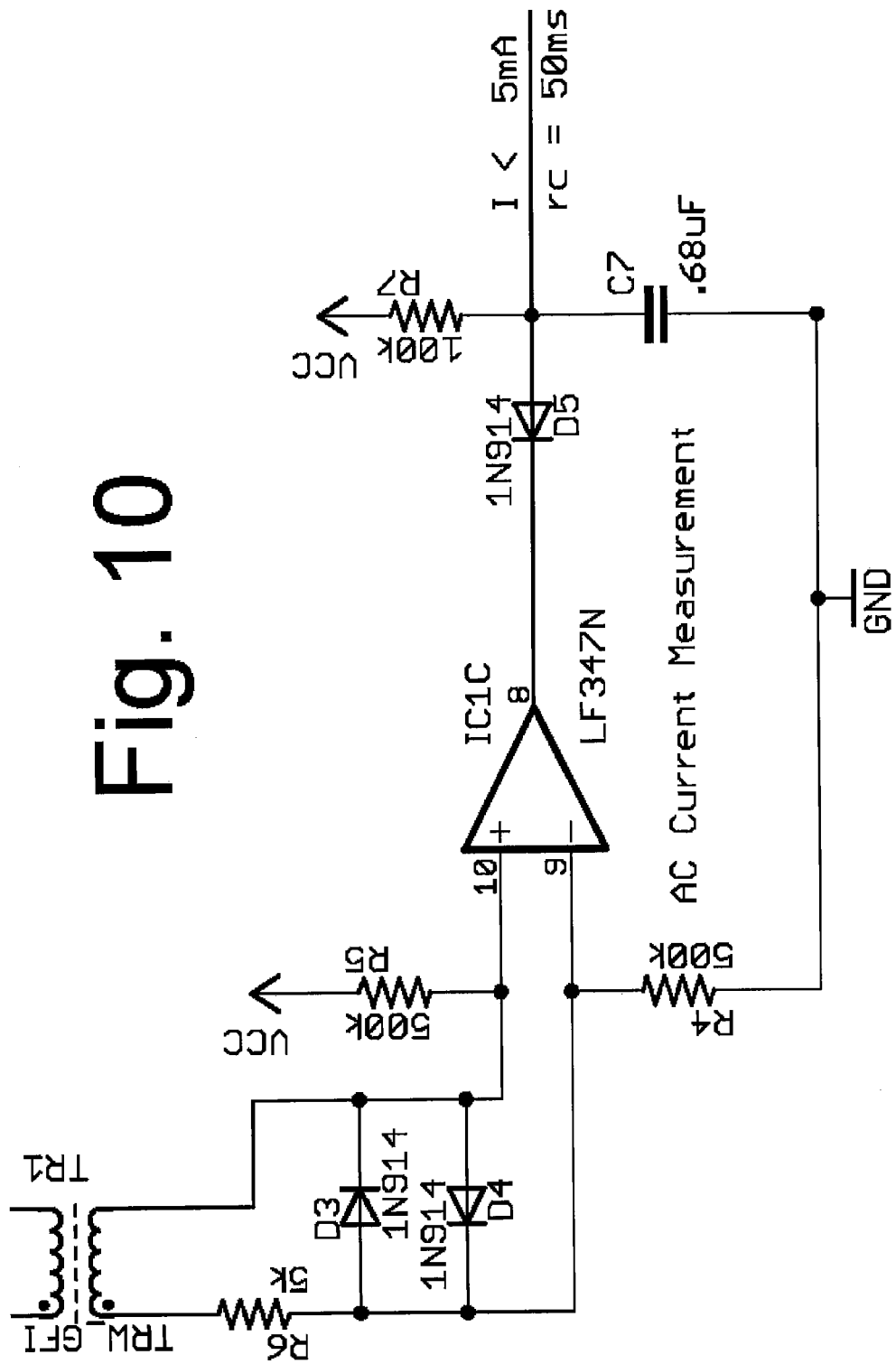
FIG. 10 shows a circuit diagram of one of the sub-circuits identified in FIG. 4.

The sub-circuit 66, depicted in FIG. 10, monitors the AC current going to the receptacle 32 to determine when the power to the receptacle 32 should be turned off. This sub-circuit 66 determines when the load current drops below a selected threshold value, the threshold value in the depicted embodiment being about 5 milliamps. The sub-circuit 66 uses a 1:1000 transformer TR1 where the load current flows in the single-turn primary. The secondary of the transformer TR1 provides a sine wave biased up by a resistor R6. When the primary current exceeds a threshold set by this bias voltage, a comparator IC1C produces a 60 Hz pulse train. The pulse train is averaged by a 1st order filter that incorporates a reset diode D5 and that is formed by a resistor R7 and a capacitor C7. This filter maintains a logic LOW state between successive pulses from the comparator IC1C as long as the pulses are being received, and moves to a logic HIGH state when the pulses discontinue due to a drop in the load current below the threshold value.

Figure 11:
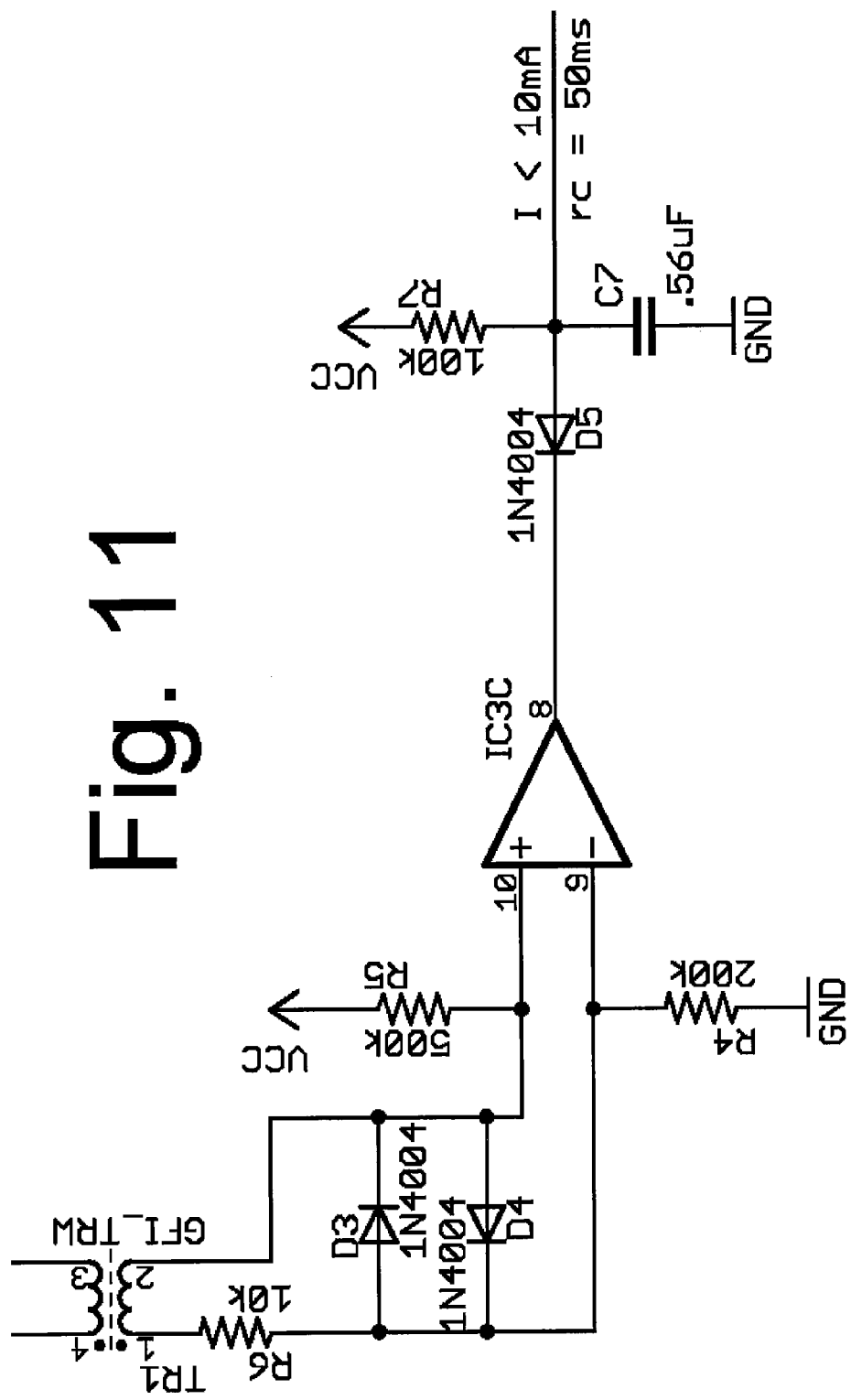
FIG. 11 shows an alternate circuit diagram of the sub-circuit shown in FIG. 10.

FIG. 11 depicts an alternate sub-circuit to the sub-circuit 66 depicted in FIG. 10. The sub-circuit of FIG. 11 has a difference in that the resistor R6 of FIG. 10 (of 5 kilo-ohms) has been replaced by resistor R6 of FIG. 11 of 10 kilo-ohms, increasing the shut-off current threshold to about 10 milliamps. This shows one way in which the circuitry of the embodiments of the present invention may be customizable and modifiable to suit the differing circumstances in which it might be used. For example, if a safety outlet 30 according to the present invention is to be placed for use in a location where it will be used solely with a certain type of appliance having certain specific known operating load characteristics and operating currents, the above-described circuits could be modified so that power is only supplied to the receptacle 32 when the appliance is operating within those known characteristics and currents. Thus, power would not be supplied to the appliance when it is damaged and operating in a way contrary to its normal operation.

Figure 12:
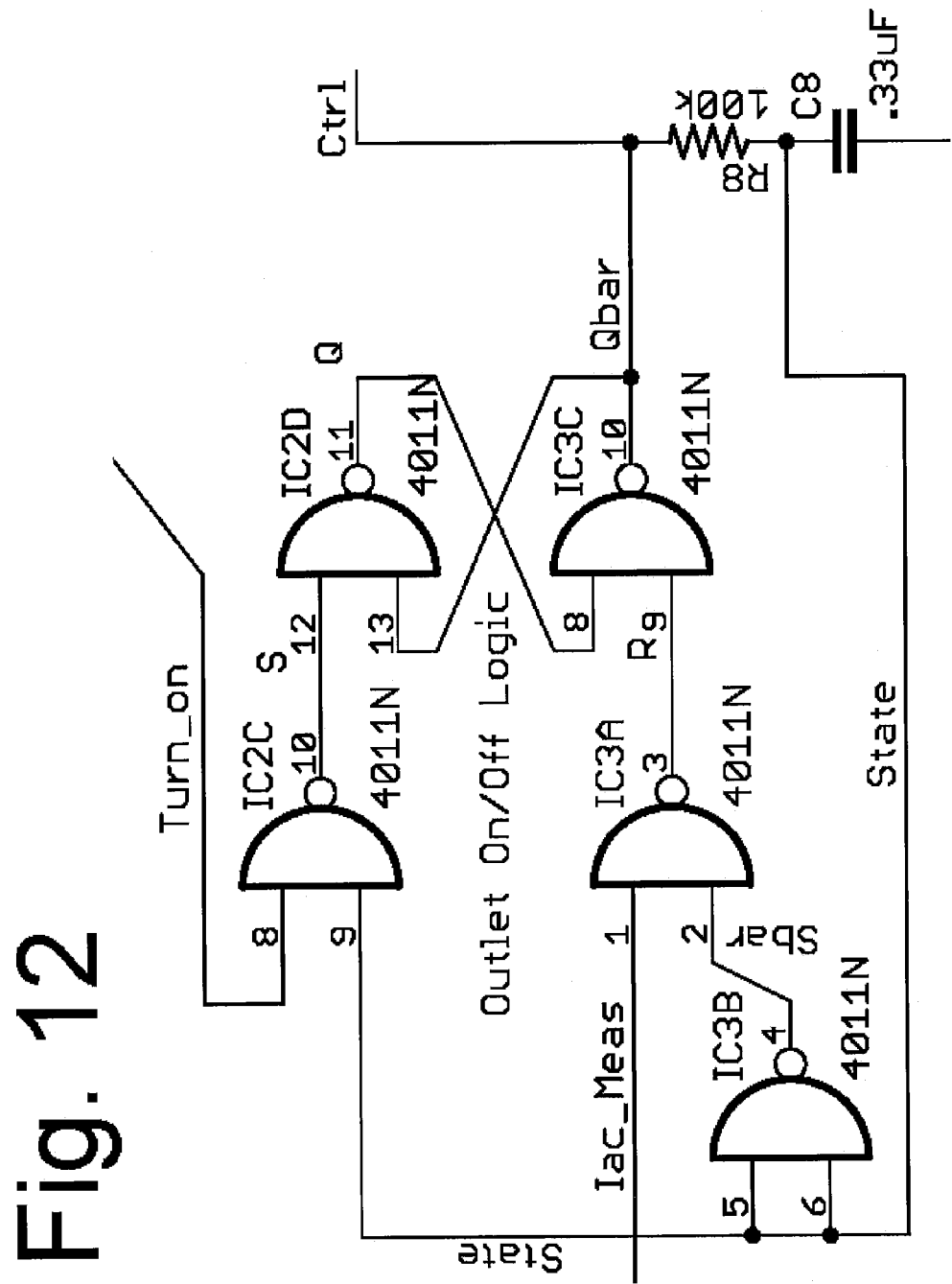
FIG. 12 shows a circuit diagram of one of the sub-circuits identified in FIG. 4.
Figure 13:
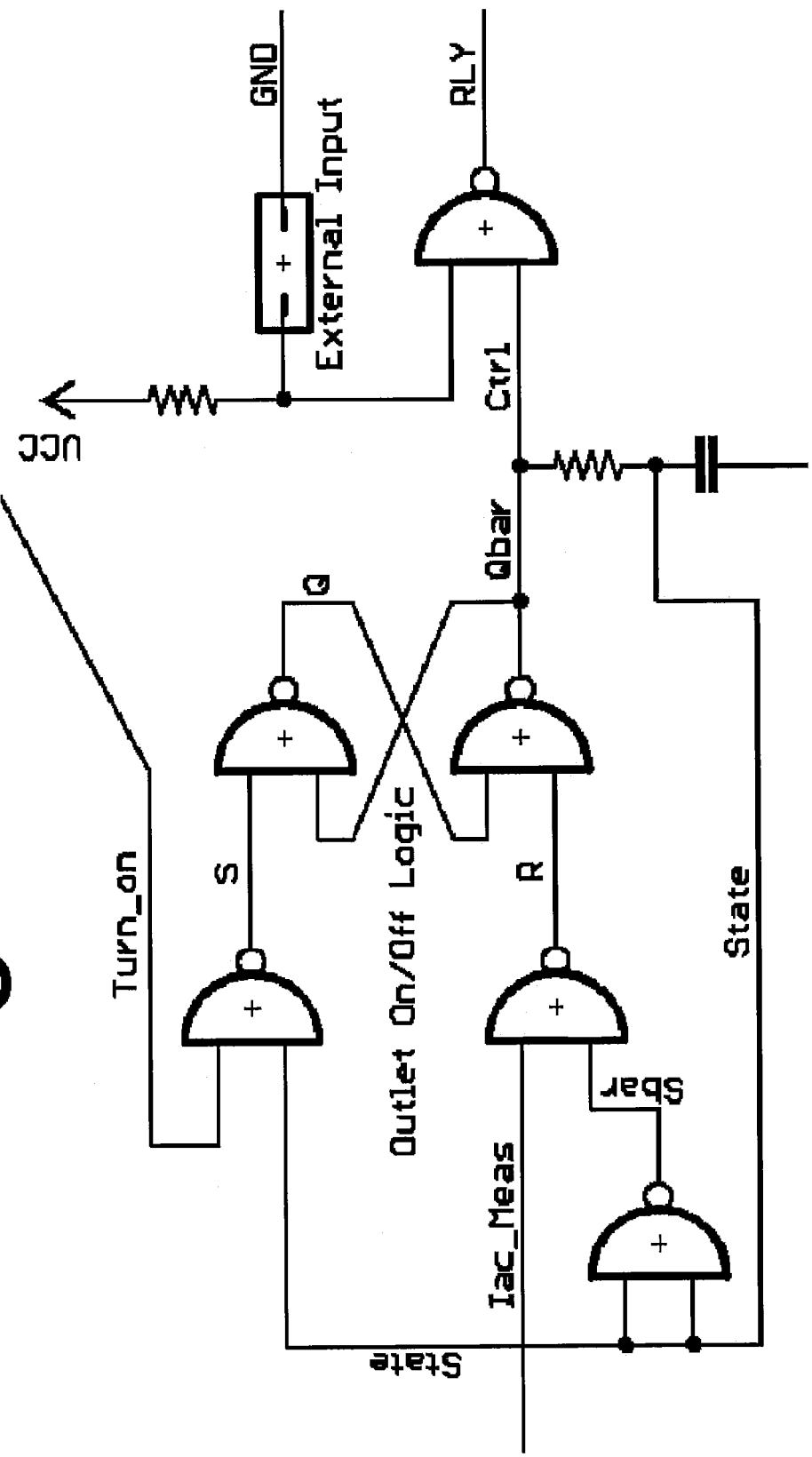
FIG. 13 shows a circuit diagram of one of the sub-circuits identified in FIG. 4, showing the on/off logic used by the embodiment of FIG. 3.

The sub-circuit 68, depicted in FIG. 12, tracks the state of the receptacle 32 and manages the transitions between the available states. This sub-circuit 66 is composed of a Set-Reset latch with bit enable gates and a delay element formed from a resistor R8 and a capacitor C8 for transitions. FIG. 13, in conjunction with Table 1, depicts the state transitions of the logic sub-circuit 68 for the process of using the safety outlet 30. At each measurable state location, the logic state may be depicted as true or false, 1 or 0, and the state locations are: Q (latch), R (reset), S (set), Qbar, Sbar, Turn_on, Iac_Meas, Ctrl, State, and RLY (relay).

Table 1 depicts the progress of states at the receptacle 32, moving from left to right, where the appliance is plugged in/turned on at the far left, used, then unplugged/turned off at the far right, with the final column representing a repeat of the initial column as the states are the same.

TABLE 1

| Circuit State | Off/Measure | Initial On | Steady On | Initial Off | Off Measure |
|---|---|---|---|---|---|
| Turn_on | 0 | 1# | 0 | 0 | 0 |
| State | 1 | 1 | 0# | 0 | 1# |
| S (Set) | 1 | 0 | 1 | 1* | 1* |
| Q (Latch) | 0 | 1 | 1 | 0 | 0 |
| Iac_Meas | 1 | 0 | 0 | 1# | 1 |
| Sbar | 0 | 0 | 1 | 1 | 0 |
| R (Reset) | 1 | 1* | 1* | 0 | 1 |
| Qbar | 1 | 0 | 0 | 1 | 1 |
| Ctrl | 1 | 0 | 0 | 1 | 1 |
| Rly | 0 | 1 | 1 | 0 | 0 |

In Table 1, the "#" symbol indicates a bit change driving the system state change, and the "*" symbol indicates a latch input bit that maintains state between system state transitions. The Off/Measure state is the state at power-on of the circuit. The Set bit is asserted slightly before the Reset bit is asserted leading the latch to assume the SET state of Q and Qbar leaving the relay off. The SET state of the latch has Q=0 and Qbar=1. The RESET state of the latch has Q=1 and Qbar=0.

The Initial On state is entered the instant the turn-on criteria are met after something is plugged into the receptacle 32 or when something plugged into the receptacle 32 is turned on. The Turn_on bit is asserted. This assertion causes the latch to assume the RESET state, changing the polarity of Q and Qbar. This in turn switches on the relay.

After the delay element has had time to settle on steady state, the Steady On state is entered. After approximately 30 ms, the voltage falls sufficiently to not assert the state bit. This in turn asserts the Set bit which is, in a sense, arming the latch for when the Reset bit will not be asserted (the time to turn the relay off). The Reset bit is asserted through this transition of the Set bit. This maintains the latch in the RESET state, and thereby keeping the Relay turned on. The delay element introduces delay between each system state transition to provide time for the measuring circuits to accurately reflect reality. In the Steady On state it prevents the circuit from arming the Set bit and then switching off the relay before the Iac_Meas bit can be un-asserted. In other words, it gives the AC current measuring circuit (Iac_Meas) sufficient time to accurately reflect the load placed on the outlet.

When the current to the plugged-in load drops sufficiently low that the outlet can be switched off (i.e. the appliance has been unplugged or turned off), the Initial Off is entered. When line current drops below the chosen lower threshold, the Iac_Meas bit is again asserted. This causes the Reset bit to no longer be asserted, which allows the latch to assume the SET state because the Set bit was asserted.

After the delay element has had time to settle, the circuit is returned to the original power-on Off Measure state. About 30 ms after the receptacle 32 has been turned off, the voltage rises sufficiently on the delay element to assert the State bit. This causes the Reset bit to be asserted in preparation for when the set bit will be let go (time to turn on the relay). The latch maintains the SET state because the Set bit is asserted across the transition of the Reset bit. This state matches the power-on state of the circuit. In this state the circuit is prepared for something to be plugged into the outlet again or to be turned on again.

Figure 14:
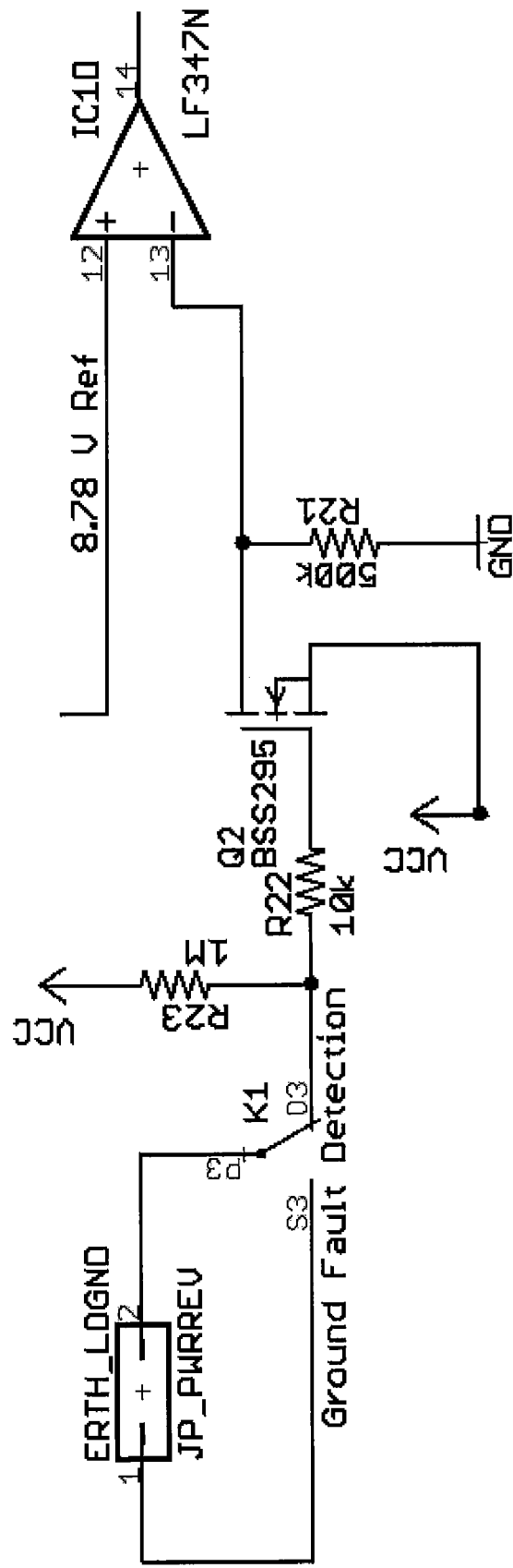
FIG. 14 shows a circuit diagram of a ground-fault-detection circuit capable of use with the embodiment shown in FIG. 3 or with other embodiments of the invention.

FIG. 14 depicts a ground fault detection circuit that could be used in conjunction with some embodiments of the present invention, including the embodiment depicted in FIG. 3. This circuit adds ground fault protection to the safety outlet 30 before the receptacle 32 receives AC power. This embodiment of ground fault detection circuitry functions by trying to drive current from the ground pin of the outlet, through a ground fault and back to either power slot in the receptacle 32. When a very limited amount of current flows in this path, such as 10 micro-amps, it is detected. The flow of current in this path triggers the fault condition where the safety outlet 30/receptacle 32 can not turn on. If a warning lamp or LED is provided and/or an audible alarm provided, the lamp/LED is illuminated, and the alarm sounds.

More technically, the ground fault path of interest can be seen in FIG. 14. The jumper connection JP_PWRREV shows the earth ground connected on its left at pin 1 with the outlet ground pin connected on its right at pin 2. The two power slots of the outlet are connected to the control circuit ground and measurement circuit, shown in FIGS. 9 and 6, respectively. Both slots, therefore, operate far below a DC supply voltage VCC allowing either slot to accept current from the supply voltage VCC. While in the OFF/Measurement state, as shown in FIG. 14, the outlet ground pin is isolated from the AC power system and connected to the control circuitry power supply through a resistor R23. While there is no ground fault, and consequently no current flow through the resistor R23, then the voltage applied to the gate of a transistor Q2 will be at the supply voltage VCC. With full supply voltage applied to the gate of the transistor Q2, it will not conduct, and the drain voltage will be held at ground by the connection through resistor R21 to ground. When there is a ground fault, current flows through resistor R23 and the voltage applied to the gate of Q2 drops. After reaching a threshold determined by the selection of the transistor Q2, the transistor Q2 begins to conduct, and the voltage applied to a comparator IC1D is pulled up to the supply voltage VCC. This state change is reflected in the output of IC1D and triggers the fault condition for the safety outlet 30/receptacle 32.

When all the safety criteria are satisfied and the safety outlet 30/receptacle 32 transitions to provide power to an appliance or tool, the relay K1 transitions and the outlet ground (pin 2) is connected to the earth ground (pin 1). This provides traditional grounding when the safety outlet 30/receptacle 32 is in operation.

FIG. 15 depicts warning circuitry from an embodiment similar to the embodiment of FIG. 3, or that may be added to the embodiment of FIG. 3, or may be added in conjunction to an embodiment including ground fault detection such as that provided by the circuitry of FIG. 14. The circuitry of FIG. 15 takes as input the output of the comparator IC1B (see FIG. 3) (which indicates whether the attached impedance is below the threshold impedance) and feeds it into the gate of a transistor T2 controlling an LED D2 and an audible DC warning alarm HLMP6. This embodiment, therefore, provides an audible and visual warning in cases where a short circuit is detected at the receptacle 32.

Although not depicted in the Figures, alternate embodiments may incorporate ground fault detection while the outlet is powered, similar to currently-used GFCI outlets, as one of skill in the art will readily recognize. In addition, other embodiments may incorporate other mechanisms of ground-fault detection while the outlet is not powered (besides that depicted in FIG. 14). This detection is a significant improvement over current GFCI technology that fails to shut off power before at least some potentially-shocking current has flowed to the ground fault. One alternate method may be accomplished by using a triac to isolate the outlet ground connection while the outlet is in the OFF state. Once isolated, a fourth comparator is used to measure the impedance between the outlet ground slot and either of the two power slots of the outlet. The output of this comparator is used to power the fault LED and warning alarm as well as lock the outlet so it can not turn on.

Figure 16:
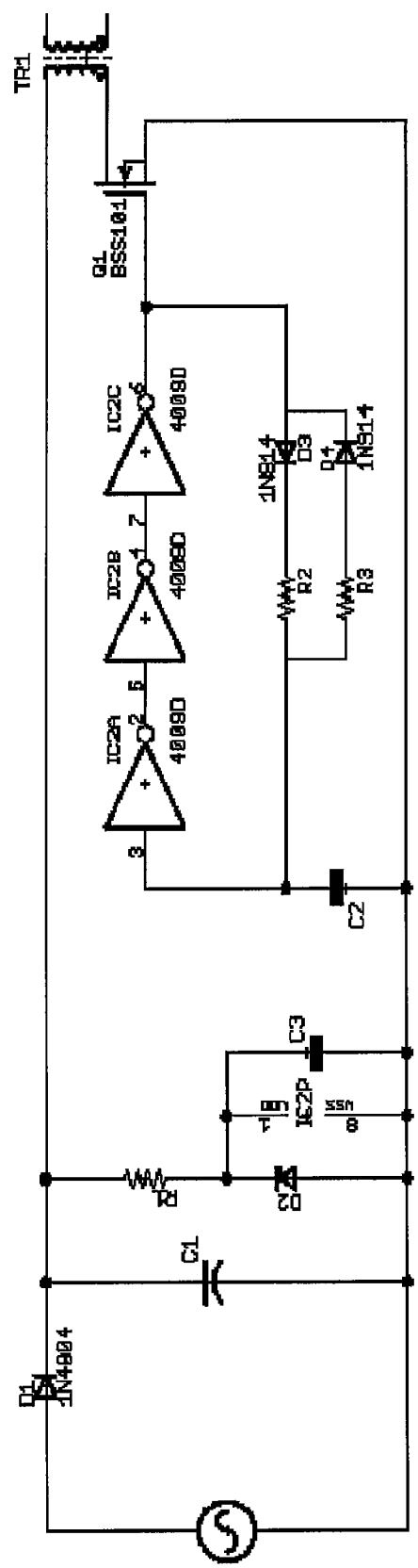
FIG. 16 shows a circuit diagram of a switching power supply sub-circuit that may be adapted for use in conjunction with the circuit of FIG. 3 or used with other embodiments of the invention.

Another embodiment incorporates a switching power supply to reduce the size and cost of the power transformer TR2, and hence the safety outlet 30. This switching power supply may take the form as shown in FIG. 16. In embodiments where the overall size of the circuit is a factor, primarily surface mount components may be used to further reduce the circuit's size.

Figure 17:
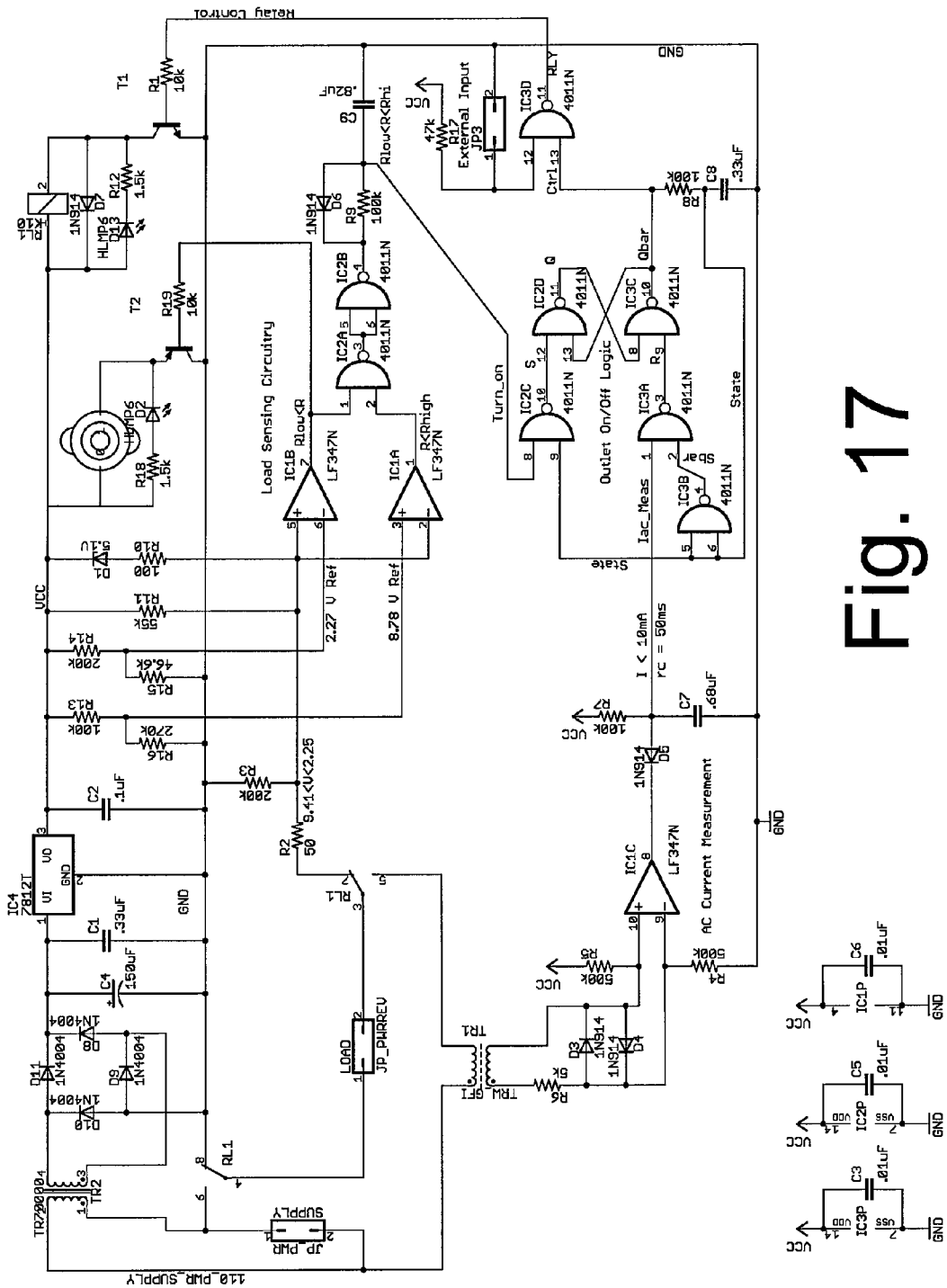
FIG. 17 shows an alternate embodiment to that of FIG. 3, incorporating the fault-warning circuit of FIG. 15.

FIG. 17 shows an alternate embodiment of the invention. The embodiment depicted in FIG. 17 includes fault-warning circuitry connected to the comparator IC1B similar to that depicted in FIG. 15. This circuitry provides the audible and visual fault warnings described above.

Figure 18:
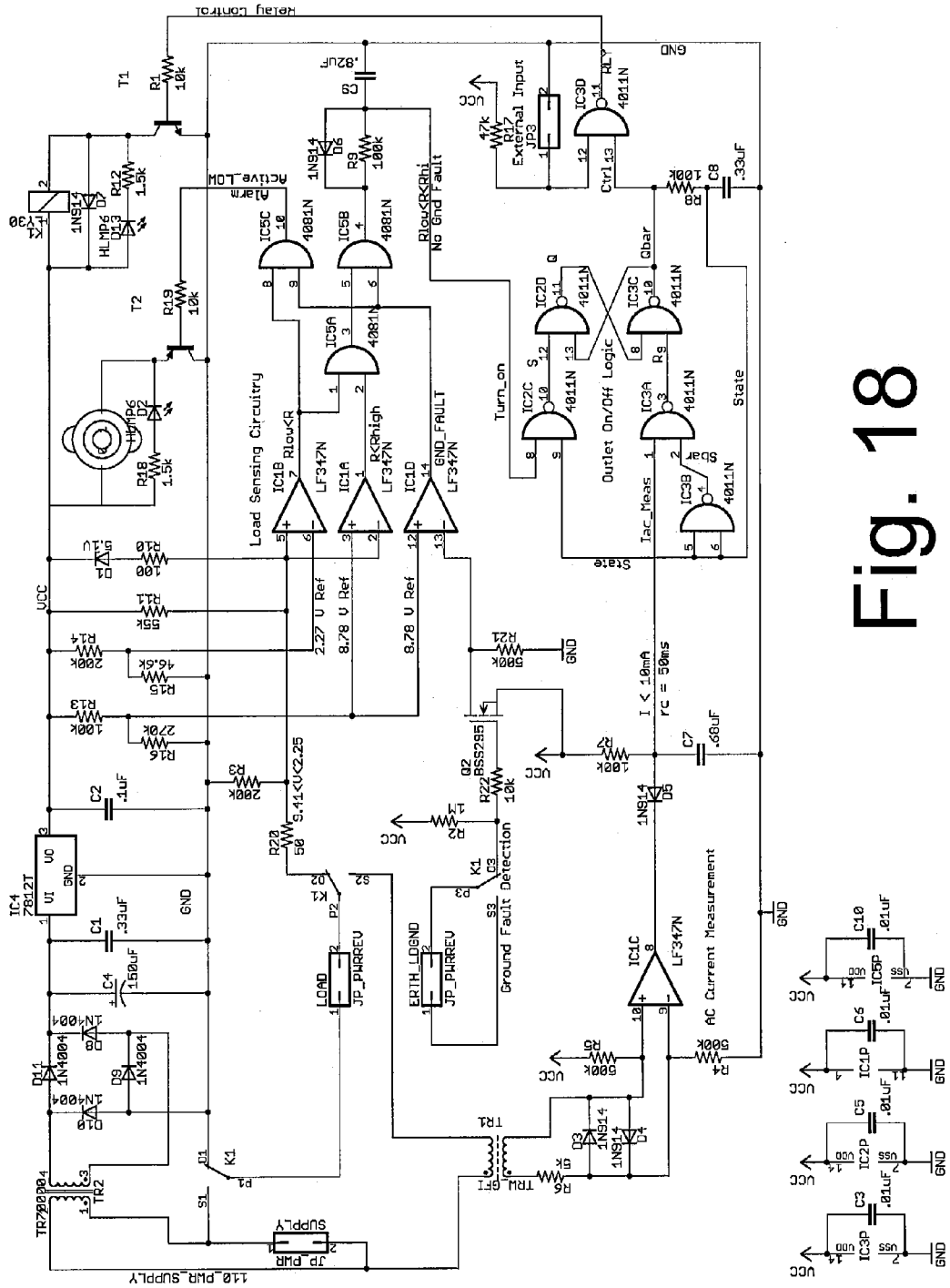
FIG. 18 shows an alternate embodiment of the invention, incorporating the ground-fault-detection circuitry of FIG. 14 and the fault-warning circuit of FIG. 15.

FIG. 18 shows another alternate embodiment of the safety-outlet circuitry. The embodiment depicted in FIG. 18 not only includes the fault-warning circuitry of FIG. 15, but also includes the ground fault detection circuitry depicted in FIG. 14. In this embodiment, the fault-warning circuitry provides a warning in case of either a short-circuit fault or a ground fault.

Referring back now to FIG. 13, FIG. 13 also shows that an external input may be added to the logic system discussed in reference to Table 1. The external input is designed to function with automated home safety systems. Such systems may be computer controlled, and often provide remote switching on and off of appliances, lights, or outlets. Using the external input depicted in FIG. 13 (and also shown in the embodiments of FIGS. 3, 17, and 18), an external control signal can be used to override the safety outlet 30 and turn the safety outlet 30 on. This is useful for providing whole-house timed lighting systems. One of skill in the art may readily appreciate that an external input may also be provided that overrides the safety outlet 30 and turns the safety outlet 30 off regardless of whether an appliance attached to the safety outlet 30 is turned on.

As another example, a lamp may be connected to the safety outlet 30, and turned on. This activates the safety outlet 30, providing power to the lamp. If a homeowner is going on vacation, the homeowner may set a home safety system to turn certain of the home's lights on and off at certain times. This could be accomplished by sending an external signal to the external input of the safety outlet 30 to turn the safety outlet 30 off at times when the lamp's light is not desired.

In addition, when using an integrated home safety system, the integrated system may also receive inputs from the connected safety outlets 30 (these outputs of the safety outlet circuitry are not shown in the Figures, but their location will be readily apparent to one of skill in the art) to provide notification of detected fault conditions remotely from the detected condition. This may be especially helpful for parents of small children playing in other rooms, as the integrated system might notify a parent of a potentially-dangerous condition where the child is playing while the safety outlet 30 prevents the potentially-dangerous condition from developing into a true hazard.

Such systems might be used in other circumstances as well. For example, an external input system might be used as a safety shutoff system in an industrial setting in cases of emergency to shut down equipment. An external input system may also be used to control other equipment, such as a "Vacancy" sign at a hotel, or some other store display. Thus, some embodiments of the invention may provide whole-system integration of individual outlets into a single system, and some embodiments allow remote activation of the safety outlets 30. Where remote activation/de-activation is desired, some embodiments provide remote activation/de-activation by wired connections, and some embodiments embrace making the connections in wireless fashion.

As discussed above, some embodiments of the invention may be customized for use in certain situations. For example, the minimum load resistance/impedance required to turn outlet power on may be varied depending on the expected use conditions. While the embodiment of FIG. 3 was discussed with reference to a minimum load resistance/impedance of 1.2 ohms, other minimums load resistances/impedances may be selected. For example, a minimum load resistance/impedance of 1.0 ohms might be used. Or, depending on the situation, minimum load resistances/impedances of 2.0, 5.0, 10, 100, 1,000 ohms, or even higher might be used to provide maximum security for a particular application. Any multiple of these values might also be used. One of skill in the art will readily recognize that any desired minimum load resistance/impedance might be used.

In addition, the maximum load resistance/impedance may also be selected for certain applications. While the embodiment of FIG. 3 was discussed with reference to 900,000 ohms, some embodiments might be provided that do not provide power to the outlet unless the detected load impedance is less than one of 100 kilo-ohms, 500 kilo-ohms, 1 mega-ohm, or even as low as tens of kilo-ohms or less, depending on the exact circumstances in which the safety outlet 30 is to be used.

In the embodiments shown, the DC voltage supplied is approximately 12 volts. Embodiments of the invention embrace other DC voltages as long as the testing voltage/current supplied is not dangerous or hazardous for shock, burn, or fire purposes. For example, voltages of 5 volts, 9 volts, or 24 volts might be supplied and used.

Some appliances, such as electric clocks, run on very little current. Therefore, some embodiments of the invention embrace shut-off detection sub-circuits 66 designed to maintain the on state of the receptacle 32 for currents lower than those described with reference to the Figures. For example, the safety outlet 30 might not shut off until the load current drops below 1 milliamps or even lower. In other embodiments, it might be expected that no load current would drop below hundreds of milliamps, and the safety-outlet 30 might be designed to shut off at a much higher current load.

Thus, embodiments of the present invention provide advantages not currently available in the existing art. Some embodiments provide ground fault detection and protection, as well as short-circuit detection and protection before providing main power to the receptacle 32. With this protection, the outlet is maintained in the off state, and it is impossible for someone to receive a shock from the outlet. Only a low DC voltage is applied at the outlet, and no DC current will flow when a metal object is inserted in one power slot of the receptacle 32 as the circuit is not completed. Thus, even minute short-term shocks that are possible with the prior art are prevented by embodiments of the invention. Some embodiments of the invention also alert the user to short circuits and/or ground faults, allowing the user to repair appliances or correct the fault.

For example, if a child were to cut the cord of an appliance connected to the outlet in such a way that creates a short circuit or ground fault, embodiments of the invention identify this, prevent power from being delivered to the cord, prevent shocks, and provide a visual and audible alarm. Thus, one of skill in the art can readily appreciate the many advantages provided by the embodiments of the present invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A safety electrical outlet for preventing hazardous conditions at the outlet by preventing the delivery of AC power to the receptacle of the outlet when no load is attached to the receptacle or when a short circuit is attached to the receptacle, comprising:
   a plug receptacle configured to receive a plug of an appliance;
   an AC line input electrically connected to an AC power source;
   an AC to DC converter directly connected to the AC line input and outputting a low-voltage DC voltage;
   a low-voltage load detection circuit powered by the DC voltage and measuring an impedance of a load connected to the receptacle of the outlet at a time when no AC power is being supplied to the receptacle, the low-voltage load detection circuit providing a power-on switching signal comprising:
      a signal of no delivery of the AC power to the receptacle when the impedance of the load at the receptacle is higher than an upper reference impedance;
      a signal of no delivery of the AC power to the receptacle when the impedance of the load at the receptacle is lower than a lower reference impedance; and
      a signal of delivery of the AC power to the receptacle when the impedance of the load at the receptacle is higher than the lower reference impedance and lower than the higher reference impedance;
   a load current detection circuit measuring an AC current passing to the receptacle when AC power is being supplied to the receptacle, the load current detection circuit providing a power-off switching signal comprising:
      a signal of delivery of the AC power to the receptacle as long as the measured AC current exceeds a minimum reference current; and
      a signal of no delivery of the AC power to the receptacle when the measured AC current drops below the minimum reference current; and
   a switching circuit receiving the power-on switching signal from the low-voltage load detection circuit and the power-off switching signal from the load current detection circuit and driving a relay electrically connecting the receptacle to alternatively (i) the low-voltage load detection circuit and (ii) the AC line input, the switching circuit driving the relay circuit to:
      electrically disconnect the low-voltage load detection circuit from the receptacle and electrically connect the AC line input to the receptacle when the signal of delivery is received from the low-voltage load detection circuit; and
      electrically disconnect the AC line input from the receptacle and electrically connect the low-voltage load detection circuit to the receptacle when the signal of no delivery is received from the load current detection circuit.

2. An outlet as in claim 1, further comprising a power-on LED that illuminates when the relay delivers AC power to the receptacle.

3. An outlet as in claim 1, further comprising a low-voltage ground fault detection circuit measuring the load connected to the receptacle concurrently with the measuring performed by the low-voltage load detection circuit, the low-voltage ground fault detection circuit providing an interrupt signal that prevents the relay from connecting the AC line input to the receptacle when a ground fault is detected.

4. An outlet as in claim 3, further comprising a fault LED that illuminates and an alarm that sounds when any of the following conditions is detected:
   a ground fault is detected in the load at the receptacle; and
   the impedance of the load at the receptacle is lower than the lower reference impedance.

5. An outlet as in claim 1, further comprising a GFCI circuit that disconnects the AC line input from the receptacle when a ground fault is detected during a time that the AC line current is connected to the receptacle.

6. An outlet as in claim 1, further comprising an external input that receives an external signal signaling an action selected from the group of:
   overriding the state of the outlet and connecting the AC line input to the receptacle; and
   overriding the state of the outlet and disconnecting the AC line input from the receptacle.

7. An outlet as in claim 1 wherein the outlet is contained in a housing designed to be plugged into and to completely cover an existing non-protected outlet, thereby converting the existing non-protected outlet into a protected outlet.

8. An outlet as in claim 1 wherein the outlet is incorporated into a power cord designed to be plugged into an existing non-protected outlet, thereby providing protection to the power cord and to any devices which may be plugged into the power cord.

* * * * *